(12) United States Patent
Mishra et al.

(10) Patent No.: US 10,592,994 B1
(45) Date of Patent: Mar. 17, 2020

(54) ORCHESTRATING ELECTRONIC SIGNATURE, PAYMENT, AND FILING OF TAX RETURNS

(71) Applicant: INTUIT INC., Mountain View, CA (US)

(72) Inventors: Shailesh Chandra Mishra, Frisco, TX (US); Tarang Swadeshkumar Sethia, Dallas, TX (US); Raymond C. Mainville, Jr., McKinney, TX (US)

(73) Assignee: INTUIT INC., Mountain View, CA (US)

(*) Notice: Subject to any disclaimer, the term of this patent is extended or adjusted under 35 U.S.C. 154(b) by 896 days.

(21) Appl. No.: 15/169,298

(22) Filed: May 31, 2016

(51) Int. Cl.
| | |
|---|---|
| G06F 17/22 | (2006.01) |
| G07F 19/00 | (2006.01) |
| G06Q 40/00 | (2012.01) |
| G06F 21/62 | (2013.01) |
| H04L 29/06 | (2006.01) |

(52) U.S. Cl.
CPC ....... G06Q 40/123 (2013.12); G06F 21/6209 (2013.01); H04L 63/10 (2013.01)

(58) Field of Classification Search
None
See application file for complete search history.

(56) References Cited

U.S. PATENT DOCUMENTS

2012/0323774 A1* 12/2012 Gardner ............... G06Q 40/00 705/40
2014/0180883 A1* 6/2014 Regan ............... G06Q 40/123 705/31

OTHER PUBLICATIONS

Internal Revenue Service. Electronic Return File Specifications and Record Layouts for Individual Income Tax Returns. Aug. 30, 2002. p. 201.*

* cited by examiner

*Primary Examiner* — Jason Borlinghaus
(74) *Attorney, Agent, or Firm* — DLA Piper LLP (US)

(57) ABSTRACT

A method and computer program product for electronically filing a financial document with an agency on behalf of a client. The document is received from a first computing device operated by an electronic filing entity. A first request is received from the first computing device to collect an electronic signature from the client on an authorization form authorizing electronic filing of the document with the agency on behalf of the client, and to collect electronic payment from the client. An electronic envelope is received from a second computing device, which is then sent to the first computing device. An authorization form may be attached to the electronic envelope and sent to the second computing device. The second computing device collects the electronic signature from the client and facilitates electronic payment from the client to a third computer. The document is then electronically filed with the agency.

50 Claims, 19 Drawing Sheets

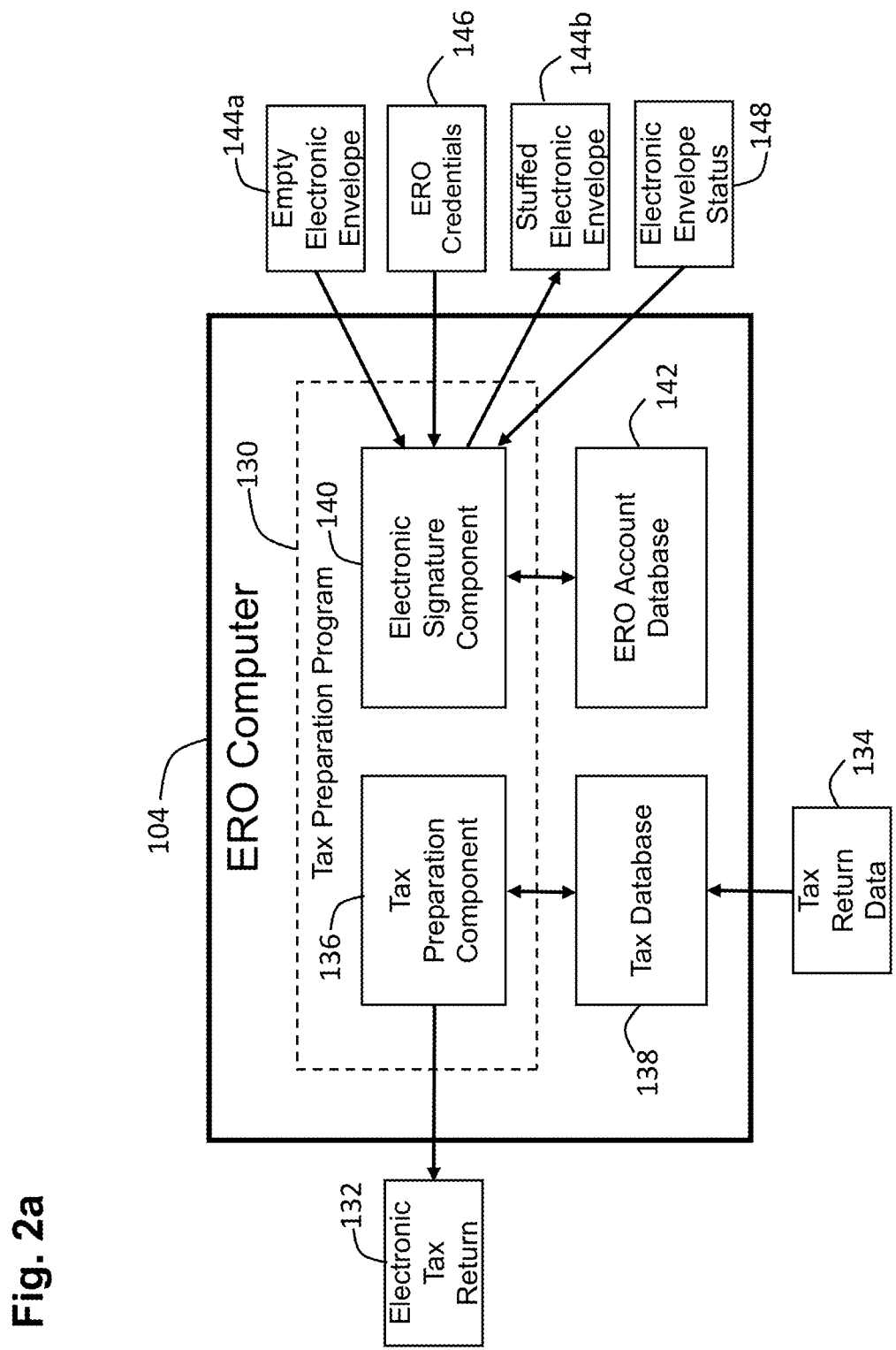

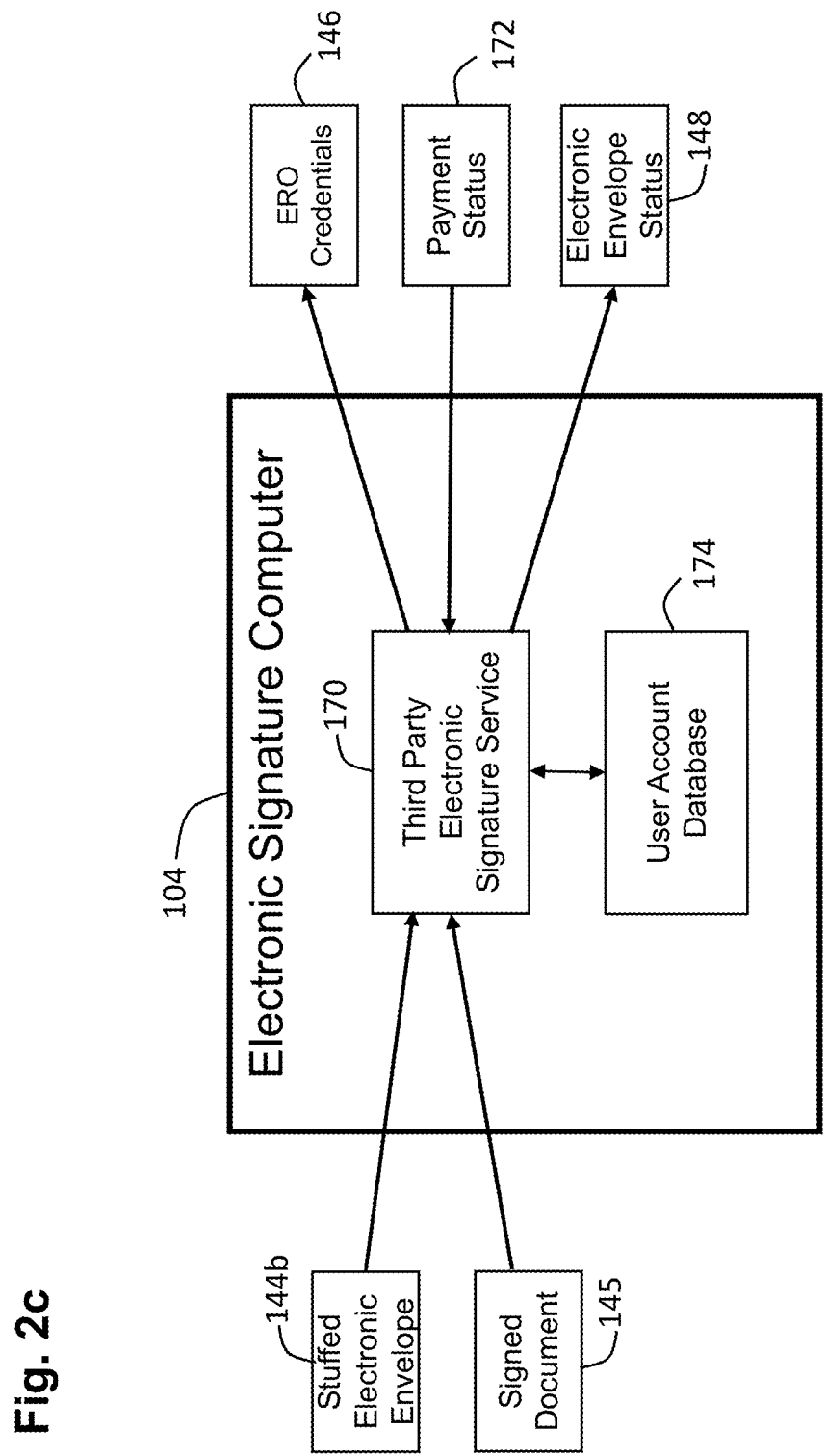

ORCHESTRATING ELECTRONIC SIGNATURE, PAYMENT, AND FILING OF TAX RETURNS

BACKGROUND

The invention relates to preparation of electronic financial documents, such as electronic tax returns. Tax preparation programs have become very popular and allow a user, such as an individual, taxpayer, accountant, or tax professional, to prepare and electronically file a tax return using a computer. At least with respect to an electronic return originator (ERO), which is an individual, typically a tax accountant or tax professional, who is authorized by the United States Internal Revenue Service (IRS) to electronically prepare and transmit tax returns for clients, such as people and companies. An ERO may charge for transmission services, and may or may not be the preparer of the transmitted tax returns. Prior to electronically filing the tax return with the IRS, an ERO must collect a signature from the tax client on a form called 8879, which is the declaration document and signature authorization for an electronically filed return filed by an ERO. Presently, this can be accomplished by electronically transmitting an "envelope" containing the form 8879 along with the tax documents, to the client via a third party electronic signature service, and electronically receiving the envelope with the signed form 8879 back from the client via the third party electronic signature service.

Assuming that the ERO charges for the preparation and/or electronic transmission of a tax return, the ERO requires payment from the client before or after the filing of the tax return. Once payment has been collected from the client and the tax return has been filed, the ERO has to update his or her accounting books to mark the invoice associated with that client as being paid. Presently, the payment collection and accounting functions are managed by the ERO separately from the electronic signature collection function, thereby decreasing the efficiency of the tax return preparation and electronic filing process.

There, thus, remains a need to better orchestrate the electronic signature collection and payment collection and accounting functions in the context of electronic tax return filing process.

SUMMARY

In accordance with the present inventions, a method and computer program product for electronically filing a financial document (e.g., an electronic tax return) with an agency (e.g., a governmental agency, such as a tax agency (e.g., the Internal Revenue Service (IRS))) on behalf of a client (e.g., taxpayer).

The present inventions solve the computer-centric or internet-centric problem found in conventional tax return filing systems that lack integrated functions for facilitating the electronic signing of authorization forms by taxpayers authorizing electronic filing entities to file tax returns on behalf of the taxpayers, making electronic payment by the taxpayers for services rendered in preparing and filing of the tax returns, and closing of invoices reflecting balances due from the taxpayers to the electronic entities.

The present inventions solve this problem by providing an electronic signature/payment orchestration service that interacts with an electronic signature service, an on-line payment service, and a taxpayer accounting service to provide these functions transparently to the electronic filing entities. The electronic filing entities may access the electronic signature/payment orchestration service, and conveniently using the same login, collect electronic signatures and payments from taxpayers via the electronic signature and on-line payment services. The electronic signature/payment orchestration may automatically instruct a tax return filing service to file the tax returns with the appropriate tax agency and further instruct a taxpayer accounting service to close the invoices upon confirmation that electronic signatures and electronic payments have been collected from the taxpayers. The present inventions utilize a graphical user interface that allows an electronic filing entity to seamlessly request collection of electronic signatures and payments from taxpayers after preparing tax returns, even though the electronic signature/payment orchestration service, electronic signature service, and on-line payment service may be operated by different hosts. Thus, the present inventions provide a real world tangible result of allowing electronic entities to more efficiently collect electronic signatures and payments from taxpayers in the context of preparing tax returns for the taxpayers.

In accordance with a first aspect of the present invention, a method for electronically filing a financial document (e.g., a tax return) with an agency (e.g., a tax agency, such as the Internal Revenue Service (IRS)) on behalf of a client (e.g., a taxpayer) is provided. The method comprises receiving a financial document from a first computing device operated by an electronic filing entity, and receiving a first request from the first computing device to collect an electronic signature from the client on an authorization form (e.g., a form 8879) authorizing electronic filing of the financial document with the agency on behalf of the client, and to collect electronic payment from the client for electronically filing the financial document with the agency.

The method further comprises sending a second request to a second computing device operated by an electronic signature service (which may be a third party electronic signature service) for an electronic envelope second computing device being operated by an electronic signature service, receiving the electronic envelope from the second computing device, and sending the electronic envelope to the first computing device, whereby the first computing device may attach the authorization form to the electronic envelope and send the electronic envelope with the authorization form to the second computing device. The second computing device collects the electronic signature from the client and facilitating electronic payment from the client to a third computer operated by an on-line payment service.

The method further comprises receiving a first status from the second computer that the electronic signature has been collected from the client, receiving a second status (which may also be from the second computer) that the electronic payment has been collected from the client, and electronically filing the financial document with the agency based on the received first status and received second status. In one embodiment, the financial document may be automatically filed with the agency in response to receiving the first status and the second status without any further intervention by the first computing device. In another embodiment, the method may further comprise sending the first status and the second status to the first computing device, in which case, the financial document may only be filed with the agency in response to subsequently receiving an instruction from the first computing device.

The collected electronic payment may be associated with an invoice reflecting a balance owed by the client to the electronic filing entity, in which case, the method may optionally comprise closing the invoice based on the received second status. In one embodiment, the invoice is automatically closed in response to receiving the second status without any further intervention by the first computing device.

The method may further comprise sending a third request to the second computing device to provision an account for the electronic filing entity with the electronic signature service, receiving an access token from the second computing device, and sending the access token to the first computing device. As such, the first computing device may send the access token to the second computing device to allow the second computing device to access the account of the electronic filing entity. The method may further comprise receiving a document access uniform resource locator (URL) from the second computing device, with the document access URL identifying a location in a database, and sending the document URL to the first computing device. The first computing device may send the document access URL to the second computing device to allow the second computing device to store the authorization form in location of the database identified by the document access URL. The method may further comprise receiving a third request from the first computing device to provide the first status and the second status, and sending the first status and the second status to the first computing device for display to the electronic filing entity. The method may further comprise determining whether the electronic filing entity is entitled to use the electronic signature service, in which case, the electronic envelope may be sent to the first computing device in response to determining that the electronic filing entity is so entitled.

In accordance with a second aspect of the present inventions, a computer program product comprising a non-transitory computer readable storage medium having stored thereupon a sequence of instructions which, when executed by a computer, electronically files a financial document (e.g., a tax return) with an agency (e.g., a tax agency, such as the Internal Revenue Service (IRS)) on behalf of a client (e.g., a taxpayer) is provided.

The computer program product comprises a financial document filing module configured for receiving a financial document from a financial document preparation program, and an electronic signature/payment orchestration module configured for receiving a first request from the financial document preparation program to collect an electronic signature from the client on an authorization form authorizing electronic filing of the financial document with the agency on behalf of the client, and to collect electronic payment from the client for electronically filing the financial document with the agency.

The electronic signature/payment orchestration module is further configured for sending a second request to electronic signature module (which may be a third party electronic signature module) for an electronic envelope. The electronic signature/payment orchestration module is further configured for receiving the electronic envelope from the electronic signature module, and sending the electronic envelope to the financial document preparation program. The financial document preparation program may attach the authorization form to the electronic envelope and send the electronic envelope with the authorization form to the electronic signature module. The electronic signature module may collect the electronic signature from the client and facilitate electronic payment from the client to an on-line payment module.

The electronic signature/payment orchestration module is further configured for receiving a first status from the electronic signature module that the electronic signature has been collected from the client, receiving a second status (which may also be from the electronic signature module) that the electronic payment has been collected from the client, and instructing the financial document filing module to electronically file the financial document with the agency based on the received first status and received second status. In one embodiment, the electronic signature/payment orchestration module may be configured for automatically instructing the financial document filing module to file the financial document with the agency in response to receiving the first status and the second status without any further intervention by the financial document preparation program. In another embodiment, the electronic signature/payment orchestration module may be further configured for sending the first status and the second status to the financial document preparation program, in which case, the electronic signature/payment orchestration module only instructs the financial document filing module to file the financial document in response to subsequently receiving an instruction from the financial document preparation program.

The collected electronic payment may be associated with an invoice reflecting a balance owed by the client to the electronic filing entity, in which case, the computer program product may optionally comprise a client accounting module, and the electronic signature/payment orchestration module may be configured for instructing the client accounting module to close the invoice based on the received second status.

The electronic signature/payment orchestration module may be further configured for sending a third request to the electronic signature module to provision an account for the electronic filing entity with the electronic signature module, receiving an access token from the electronic signature module, and sending the access token to the financial document preparation program. The financial document preparation program may send the access token to the electronic signature module to allow the electronic signature module to access the account of the electronic filing entity. The electronic signature/payment orchestration module may further be configured for receiving a document access uniform resource locator (URL) from the electronic signature module, with the document access URL identifying a location in a database, and sending the document URL to the financial document preparation module. The financial document preparation module may send the document access URL to the electronic signature module to allow the second computing device to store the authorization form in location of the database identified by the document access URL. The electronic signature/payment orchestration module may be further configured for receiving a third request from the financial document preparation program to provide the first status and the second status, and sending the first status and the second status to the financial document preparation program for display to the electronic filing entity. The electronic signature/payment orchestration module may be further configured for determining whether the electronic filing entity is entitled to use the electronic signature module, in which case, the electronic envelope is sent to the financial document preparation program in response to determining that the electronic filing entity is so entitled.

In accordance with a third aspect of the present inventions, a method for electronically filing a financial document (e.g., a tax return) with an agency (e.g., a tax agency, such as the Internal Revenue Service (IRS)) on behalf of a client (e.g., a taxpayer) is provided.

The method comprises receiving a financial document from a first computing device being operated by an electronic filing entity, receiving a first request from the first computing device to collect an electronic signature from the client on an authorization form authorizing electronic filing of the financial document with the agency on behalf of the client, and to collect electronic payment from the client for electronically filing the financial document with the agency. The electronic signature may be collected from the client, e.g., by a second computing device operated by a third party electronic signature service, and the electronic payment may be collected from the client, e.g., by a third computing device operated by an on-line payment service.

The method further comprises determining that the electronic signature has been collected from the client, and determining that the electronic payment has been collected from the client. Determining that the electronic signature has been collected from the client may comprise receiving a status from a second computing device operated by an electronic signature service, and determining that the electronic payment has been collected from the client may comprise directly or indirectly receiving status from a second computing device operated by an on-line payment service.

The method further comprises automatically filing the financial document with the agency in response to determining that the electronic signature and electronic payment has been collected from the client without further intervention from the first computing device. In an optional embodiment, the collected electronic payment may be associated with an invoice reflecting a balance owed by the client to the electronic filing entity, in which case, the method may further comprise automatically closing the invoice in response to determining that the electronic signature and electronic payment has been collected from the client without further intervention from the first computing device.

The method may further comprise provisioning an account for the electronic filing entity with an electronic signature service. The method may further comprise receiving a second request from the first computing device to provide a status on the collection of the electronic signature and electronic payment from the client, and sending the status to the first computing device for display to the electronic filing entity. The method may further comprise determining whether the electronic filing entity is entitled to use the electronic signature service, in which case, the electronic envelope may be sent to the first computing device in response to determining that the electronic filing entity is so entitled.

In accordance with a fourth aspect of the present inventions, a computer program product comprising a non-transistory computer readable storage medium having stored thereupon a sequence of instructions which, when executed by a computer, electronically files a financial document (e.g., a tax return) with an agency (e.g., a tax agency, such as the Internal Revenue Service (IRS)) on behalf of a client (e.g., a taxpayer) is provided.

The computer program product comprises a financial document filing module configured for receiving a financial document from a financial document preparation program, and an electronic signature/payment orchestration module configured for receiving a first request from the financial preparation program to collect an electronic signature from the client on an authorization form authorizing electronic filing of the financial document with the agency on behalf of the client, and to collect electronic payment from the client for electronically filing the financial document with the agency. The electronic signature may be collected from the client by a third party electronic signature module, and the electronic payment may be collected from the client by an on-line payment module.

The electronic signature/payment orchestration module is further configured for determining that the electronic signature has been collected from the client, and determining that the electronic payment has been collected from the client. The electronic signature/payment orchestration module may be configured for determining that the electronic signature has been collected from the client by receiving a status from an electronic signature module, and determining that the electronic payment has been collected from the client by directly or indirectly receiving status from an on-line payment module.

The electronic signature/payment orchestration module is further configured for automatically instructing the financial document filing module to file the financial document with the agency in response to determining that the electronic signature and electronic payment has been collected from the client without further intervention from the financial document preparation program. In an optional embodiment, the collected electronic payment may be associated with an invoice reflecting a balance owed by the client to the electronic filing entity, in which case, the computer program product may further comprise a client accounting module, and the electronic signature/payment orchestration module may be configured for automatically instructing the client accounting module to close the invoice in response to determining that the electronic signature and electronic payment has been collected from the client without further intervention from the financial document preparation program.

The electronic signature/payment orchestration module may be further configured for provisioning an account for the electronic filing entity with an electronic signature module. The electronic signature/payment orchestration module may be further configured for receiving a second request from the financial document preparation module to provide a status on the collection of the electronic signature and electronic payment from the client, and sending the status to the financial document preparation module for display to the electronic filing entity. The electronic signature/payment orchestration module may be further configured for determining whether the electronic filing entity is entitled to use the electronic signature service, in which case, the electronic envelope may be sent to the financial document preparation program in response to determining that the electronic filing entity is so entitled.

Other and further aspects and features of the disclosed embodiments will be evident from reading the following detailed description of the embodiments, which are intended to illustrate, not limit, the invention.

BRIEF DESCRIPTION OF THE DRAWINGS

The drawings illustrate the design and utility of various embodiments of the present invention, in which similar elements are referred to by common reference numerals. In order to better appreciate how the above-disclosed and other advantages and objects of the various embodiments are obtained; a more particular explanation is provided below with reference to specific embodiments thereof, which are illustrated in the accompanying drawings. However, these drawings depict only some embodiments of the invention, and are not therefore to be considered limiting of its scope. A brief description of the drawings is provided below:

FIG. 2a is a block diagram of an electronic return originator (ERO) computer used in the electronic tax return filing system of FIG. 1;

FIG. 2c is a block diagram of an electronic signature computer used in the electronic tax return filing system of FIG. 1;

FIG. 10 is a plan view of a list of authentication questions displayed by the system of FIG. 1 to the taxpayer;

DETAILED DESCRIPTION OF ILLUSTRATED EMBODIMENTS

Figure 1:
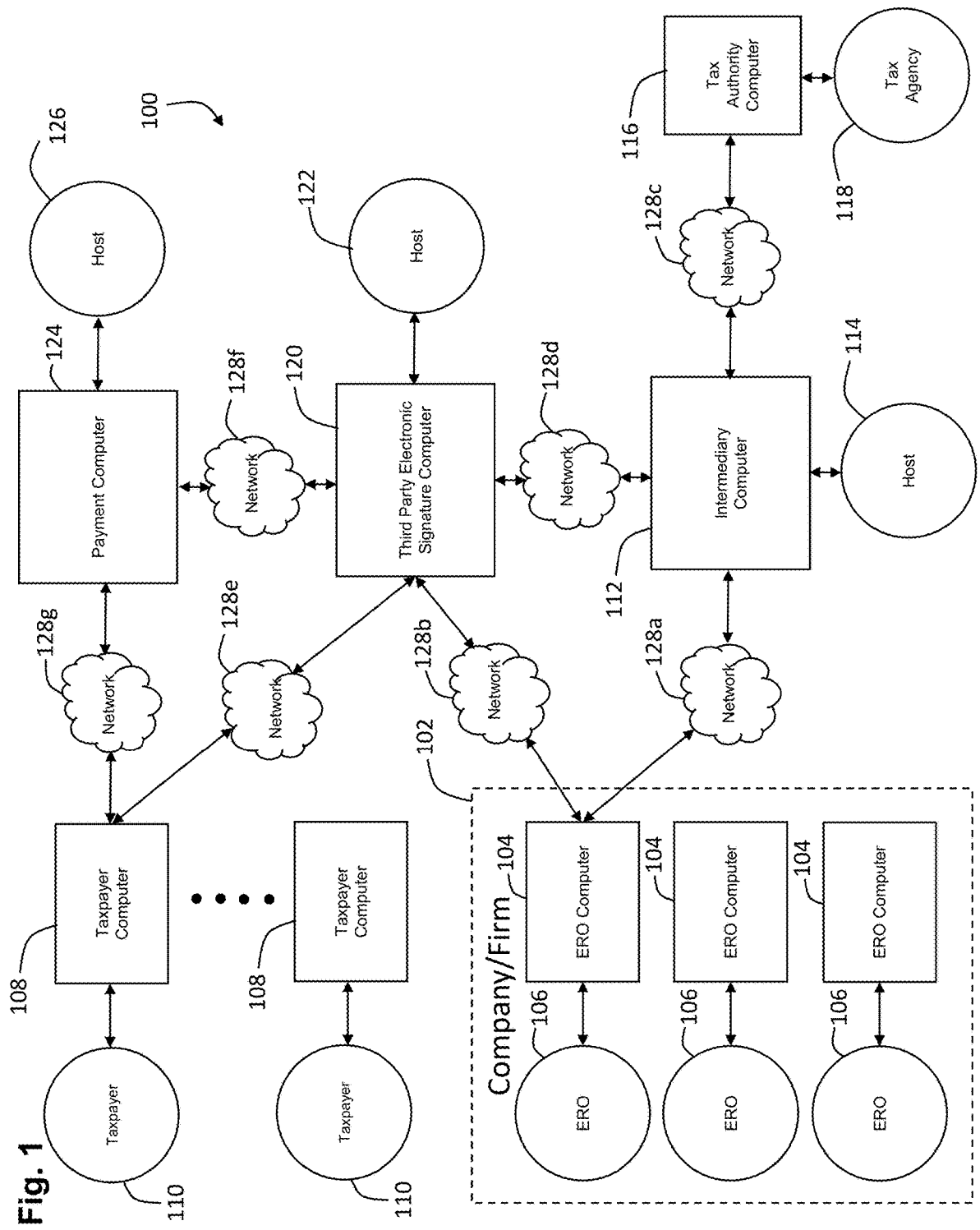
FIG. 1 is a block diagram of an electronic tax return filing system constructed according to one embodiment of the present inventions for preparing and filing an electronic tax return with a tax authority.

Embodiments described herein relate orchestrating the collection of an electronic signature authorizing the electronic filing of a tax return with a tax agency, such as the Internal Revenue Service (IRS), on behalf of taxpayers by an electronic filing entity, such as an electronic return originator (ERO), collection of payment from the taxpayers to the ERO for rendering services in the preparation and electronic filing of the tax returns with the tax agency, and updating the accounting books of the ERO in response to payment from the taxpayers, and ultimately the electronic filing of the tax returns with the tax agency.

The embodiments described herein utilize an electronic signature/payment orchestration service that coordinates the electronic signature and payment collection between an ERO and taxpayers via a third party electronic signature service. Significantly, the electronic signature/payment orchestration service seamlessly provisions an electronic signature account ("e-sign" account) for the ERO with the third party electronic signature service using a login to an existing account that the ERO already has with an electronic tax return filing service. For example, the ERO may log into the electronic tax return filing service as a standard practice, and then select an option to utilize the electronic signature/payment orchestration service, which if not already performed, provisions an account for the ERO with the third party electronic signature service, thereby enabling usage of the third party electronic signature service with this pre-existing login to the electronic tax return filing service.

Embodiments described herein generate an electronic envelope that is transmitted to the ERO in response to a request from the ERO. The electronic envelope is a secure electronic data container that is used to protect a message or attachment from being read by entities other than the intended recipient through encryption and data authentication. The electronic envelope is generated by the third party electronic signature service and transmitted to the electronic signature/payment orchestration service as the intermediary, which is then forwarded onto the ERO. The ERO may attach an authorization form (in this case, a form 8879) authorizing electronic filing of the tax return on behalf of the taxpayer, as well as the tax return to the electronic envelope, and incorporate a message into the electronic envelope that instructs a taxpayer to electronically sign the authorization form and to electronically make payment to the ERO for preparation of the tax return. The ERO may then transmit the electronic envelope, along with the attachments, to the taxpayer via the third party electronic signature service. Prior to allowing the taxpayer to access the attachments and message, the third party electronic signature service may query the taxpayer with authentication questions, the correct answers to which will authenticate the taxpayer as the intended recipient of the electronic envelope.

Upon receipt, the taxpayer may electronically sign and transmit the authorization form back to the third party electronic signature service, and make payment to an on-line payment service. The third party electronic signature service may obtain payment status from the on-line payment service, and provide status of the signed authorization form and payment to the electronic signature/payment orchestration service, which may then automatically instruct the electronic tax return filing service to file the tax return and authorization form with the tax agency without intervention from the ERO. The electronic signature/payment orchestration service may also automatically update an accounting database containing an invoice reflecting a balance owed by the taxpayer to the ERO for services rendered in preparing and filing the tax return.

The electronic signature/payment orchestration service provides a number of free trial usages to the ERO (e.g., five free uses) at the time of account provisioning with the third party electronic signature service, and maintains the validity of the trial for a predetermined period of time (e.g., ninety days) from the time of account provisioning. The electronic signature/payment orchestration service provides capability to plug into any billing service (e.g., a billing service that receives purchases made through a phone and an agent; a billing service that receives purchases on-line through the tax return filing service, a billing service that handles "billing in arrears" arrangements with the ERO, etc.), so that purchases for each electronic envelope can occur in any billing service.

In the case where the ERO is not billed in arrears, the electronic tax return filing service will manage an available electronic envelope balance that is decreased with each usage of an electronic envelope and increased with each purchase of an electronic envelope. Usage of the purchased electronic envelopes is composed of actual signed envelopes and outstanding envelopes that have been transmitted to the taxpayers, but have yet to be signed. The electronic signature/payment orchestration service deducts actually signed envelopes from the trial and/or purchase balance of available envelopes from the account of the ERO, but only provisionally deducts outstanding envelopes from the available balance for envelopes that have been sent to the taxpayers but not yet signed. Upon signing of the envelopes by the taxpayers, these envelopes will be actually deducted from the available balance. Any outstanding envelope can be cancelled or revoked by the ERO, in which case, the available balance will be increased upon such cancellation or revocation.

The ERO may request an available balance on the account at any time, and the electronic signature/payment orchestration service will return the net available balance, taking into account any outstanding envelopes that have been provisionally deducted, to the ERO. The electronic signature/payment orchestration service may track the total sum of payments collected from the taxpayers associated with the ERO, and may also track the total amounts invoiced to the taxpayers associated with the ERO. For example, the electronic signature/payment orchestration service may seamlessly provide status of the payment amounts made to the on-line payment service. The ERO need only log into the electronic tax filing return service and access the electronic signature/payment orchestration service to view payment information associated with the completed electronic envelopes. The electronic signature/payment orchestration service may keep track of the turn-around time for the electronic envelopes (i.e., how much time it takes for electronic envelopes to be returned by the taxpayers from the time that the electronic envelopes are transmitted to the taxpayers). The electronic signature/payment orchestration service may also keep track of the electronic envelopes that have exceeded the time it should take for the electronic envelopes to be completed by the taxpayers, and attempts to fetch the latest status of these electronic envelopes from the third party electronic signature service.

Referring now to FIGS. 1 and 2a, an electronic tax return filing system 100 constructed according to one embodiment of the present inventions will now be described. The system 100 includes a plurality of electronic return originator (ERO) computers 102. A financial document preparation program (and in this case, a tax preparation program) 130 executes on each of the ERO computers 102 to prepare an electronic tax return 132 based upon tax return data 134 received at the respective ERO computer 102 for subsequent submission to an appropriate tax agency 118, examples of which include a federal tax authority, e.g., the Internal Revenue Service (IRS), a state tax authority or other tax collecting entity of the United States, a state thereof, or another country or state thereof (generally, "tax authority").

Each ERO computer 102 may be a home or business computer utilized by an ERO 106 who typically, but not necessarily, will be an accountant or a tax professional preparing a personal or corporate or business entity tax return 132 for clients, in this case taxpayers 110. Alternatively, the ERO 106 may be an individual who, e.g., is responsible for electronically filing the tax return with the tax agency 118 on behalf of an accountant or a tax professional. Each of the taxpayers 110 communicates with other computers subsequently described herein via a conventional computer 108 equipped with standard e-mail and web browser software (not shown). Although only three EROs 106 and associated ERO computers 102 are described and illustrated in FIG. 1, it should be appreciated that the system 100 will typically include many more EROs 106 and associated ERO computers 104. In the illustrated embodiment, the EROs 106 and associated ERO computers 104 are associated with a company/firm 102, although in other embodiments, an ERO 106 and associated ERO computer 104 need not be associated with any company/firm 102, but instead may be, e.g., a solo practitioner.

The tax preparation program 130 will typically be a professional tax preparation program, although it may alternatively be a consumer-level tax preparation program. Examples of professional tax preparation programs 110 that may utilize the embodiments described herein include INTUIT TAX ONLINE, PROSERIES, and LACERTE, available from Intuit Inc. INTUIT TAX ONLINE, PROSERIES, AND LACERTE are registered trademarks of Intuit Inc.

The tax preparation program 130 comprises a financial document preparation component (and in this case, a tax preparation component) (or software module) 136, which operates in a conventional manner by performing tax calculations in response to tax data entered into the tax preparation program 130 to generate electronic tax returns 132, as well as initiating the electronic filing of electronic tax returns 132 with the appropriate tax agency 118.

For the purpose of preparing the tax returns 132, the tax preparation program 130 obtains tax return data 134 for input into a tax database 138. The tax database 138 also stores partially completed or fully completed tax returns 132 for various ones of the taxpayers 110. The tax return data 134 may be entered into the user computer 102 in one of a number of different manners. For example, the tax return data 134 may originate from the ERO 106, in which case, the tax return data 134 may be manually entered into the computer 102. The tax return data 134 may alternatively be automatically entered into the computer 102. For example, the tax return data 134 may be embodied in a photographic image of a tax document (e.g., a prior IRS Form 1040, W-2, etc.) that can be scanned into the computer 102, and then processed by the tax preparation program 130 to extract relevant data that are then automatically transferred and stored within the tax database 138. Object Character Recognition (OCR) techniques along with pre-stored templates of tax forms may be called upon to extract relevant data from the scanned or photographic images whereupon the data is then transferred to the tax database 138.

As another example, the tax return data 134 may be electronically stored in a remote database. The electronically stored tax return data 134 can be searched, copied and transferred to the tax database 138. The tax forms may be in a proprietary format (e.g., .txf, .pdf) or an open source format. An online resource may include, for example, websites for the employer that contain tax-related information. For example, financial service providers such as banks, credit unions, brokerages, investment advisors typically provide online access for their customers to view holdings, balances, transactions. In another example, prior tax returns may be obtained by accessing a government database (e.g., IRS records). Tax-related information can also be accessed from financial accounting applications, such as QUICKBOOKS, available from Intuit Inc. of Mountain View, Calif.

In facilitating the entry of the tax return data 134, the user computer 102 may provide a visual screen or series of screens to the ERO 106. For example, the user computer 102 may present pre-programmed interview screens containing a series of questions that can be answered by the ERO 106 or requests to include dollar amounts, check or un-check boxes, select one or more options from a pull down menu, select radio buttons, or the like. Alternatively, the user computer 102 may present a form containing fillable form fields for the ERO 106. However entered, the tax data is transferred or copied to the tax database 138 and entered into the data entry fields of the electronic tax return 132.

More significant to the present inventions, the tax preparation program 130 further comprises an electronic signature component (or software module) 140 that facilitates the transmission of electronic tax returns 132, authorization forms (in this case form 8879s), and payment requests and instructions, to the taxpayers 110, and the subsequent collection of electronic signatures on the form 8879s and payments from the taxpayers 110 for the preparation and electronic filing of the tax returns 132 with the tax agency 118. The electronic signature component 140 accomplishes these functions via the use of an electronic envelope. In particular, the electronic signature component obtains an empty electronic envelope 144a and attaches documents, such as an electronic tax return 132 and the form 8879, and payment instructions, to create a "stuffed" electronic envelope 144b that is then transmitted to the taxpayer 110. The electronic signature component 140 also receives credentials 146 (e.g., username and password, as well as access token described in further detail below) for allowing the ERO 106 to login to and access the tax preparation program 130, and for allowing the ERO 106 to receive, stuff, and transmit electronic envelopes 144. The ERO computer 102 further comprises an ERO account database 142 that locally stores these credentials. The electronic signature component 140 also receives an electronic envelope status 148 that provides information on the status of a stuffed electronic envelope 144b, e.g., whether the form 8879 has been electronically signed by the taxpayer 110 and whether payment has been made by the taxpayer 110.

While FIG. 2 illustrates the tax preparation program 130 and databases 138, 142 as residing on the same ERO computer 102, the entirety of the tax preparation program 130, or any one or more components thereof, may be located remotely, for example, in a cloud environment or another remotely located computer that is accessible by the ERO computer 102 through a network. For example, the tax preparation program 130 may alternatively reside and be executed on a remote computing device, such as an intermediary computer 112. In latter case, the ERO computer 102 communicates with the intermediary computer 112 using an application (not shown) contained on the ERO computer 102, such as conventional Internet browser software.

Figure 2B:
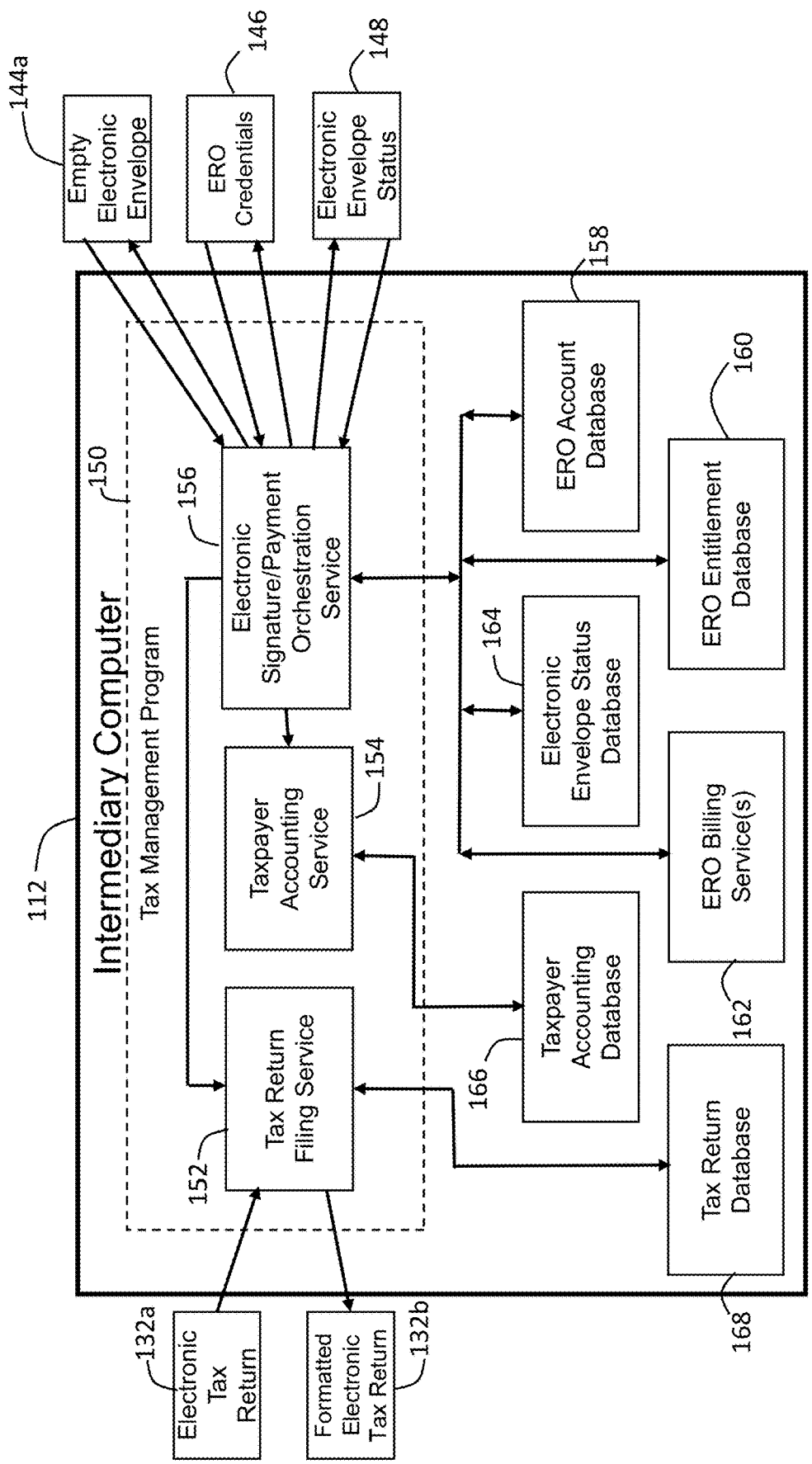
FIG. 2b is a block diagram of an intermediary computer used in the electronic tax return filing system of FIG. 1.

Referring to FIGS. 1 and 2b, the electronic tax filing system 100 further comprises an intermediary computer 112 managed by a host 114 for facilitating the preparation and electronic filing of tax returns. Examples of hosts 114 that provide intermediary computers for these purposes include, for example, Intuit Inc., which provides the intermediary computer 112 or server of the Intuit Electronic Filing Center for electronically filing tax returns 132, and other hosts 114 that provide tax preparation programs and electronic filing servers.

A financial document management program (and in this case, a tax management program) 150 executes on the intermediary computer 112 to manage the tax return filing, electronic signature, payment, accounting, and billing functions, as will be described in further detail below. The tax management program 150 comprises a financial document filing service (and in this case, a tax return filing service) (or software module) 152 configured or operable to conventionally receive electronic tax returns 132a from the EROs 106, and format and electronically file electronic tax returns 132b with a computer 112 of the tax agency 118. The tax management program 150 further comprises a client accounting service (and in this case, a taxpayer accounting service) (or software module) 154 configured or operable to generate and manage billing invoices between the EROs 106 and the taxpayers 110.

More significant to the present inventions, the tax management program 150 comprises an electronic signature/payment orchestration service (or software module) 156 configured or operable to coordinate the collection of electronic signatures on form 8879s from the taxpayers 110, collect payments for services rendered in preparing the tax returns from the taxpayers 110, update billing invoices between the EROs 106 and the taxpayers 110, and ultimately electronically file tax returns 132 with the tax agency 118 via the tax return filing service 152.

To this end, the electronic signature/payment orchestration service 156 receives and forwards empty electronic envelopes 144a to the electronic signature components 140 of the tax preparation programs 130 residing on the ERO computers 104, receives status (including electronic signatures and payments made) of any stuffed electronic envelopes 144b sent from the ERO 106 to the taxpayers 110, filters and sends to these electronic signature components 140 the electronic envelope status 148 of any stuffed electronic envelopes 144b sent from the EROs 106 to the taxpayers 110, and obtains and sends the aforementioned credentials 146 to these electronic signature components 140.

The intermediary computer 112 further comprises an ERO account database 158 that locally stores these credentials 146 and an ERO entitlement database 160 that stores information regarding whether a particular ERO 106 is entitled to stuff and send electronic envelopes 144 to taxpayers 110 via the electronic signature/payment orchestration service 156, and in particular, stores an available envelope balance for the ERO 106. The ERO 106 may stuff and send electronic envelopes 144 on a trial basis, a purchase basis, or "billing in arrears" basis (i.e., billed on a monthly basis after usage), and either via the telephone or on-line through the tax preparation program 130.

The intermediary computer 112 further comprises one or more ERO billing services 162 (e.g., a billing service that receives purchases made through a phone and an agent, a billing service that receives purchases on-line through the tax return filing service, and/or a billing service that handles "billing in arrears" arrangements with the ERO, etc.). In the case where the ERO 106 is billed in arrears, the billing service(s) 162 keep track of all uses of the electronic signature/payment orchestration service 156.

The intermediary computer 112 further comprises an electronic envelope status database 164 that stores status of all electronic envelopes 144 sent from the EROs 106 to taxpayers 110, including outstanding envelopes that are incomplete in that the electronic signature and payment requests required for completion of the electronic envelope have not been performed, and all electronic envelopes that are complete in that both the electronic signature request and payment request (if needed) have been performed. The intermediary computer 112 further comprises a taxpayer accounting database 166 that stores information regarding the billing invoices between the EROs 106 and the taxpayers 110. The intermediary computer 112 further comprises a tax return database 168 that stores the electronic tax returns 132*a* received from the EROs 106 and the electronic tax returns 132*b* formatted by the tax return filing service 152.

Although, for purposes of brevity, only a single intermediary computer 112 is illustrated in FIG. 1 to perform the aforementioned functions, it should be appreciated that these functions can be, and are often, distributed amongst several intermediary computers. For example, one intermediary computer 112 can be used to perform the tax return filing service 152, another intermediary computer 112 can be used to perform the taxpayer accounting service 154, and still another intermediary computer 112 can be used to perform the electronic signature/payment orchestration service 156.

Referring to FIGS. 1 and 2*c*, in the illustrated embodiment, the electrical signature collection and payment functions are facilitated using a conventional third party electronic signature service (or software module) 170 residing on an electronic signature computer 120, which is managed by a host 122, such as Docusign Inc. The third party electronic signature service 170 serves as the intermediary between the EROs 106 and the taxpayers 110 to facilitate the function of collecting electronic signatures on form 8879s and payments from the taxpayers 110. To this end, the third party electronic signature service 170 receives signed documents 145 from the taxpayers 110, receives payment status 172 as to whether the taxpayers 110 had made payments if required by the stuffed electronic envelopes 144*b*, sends to the electronic signature/payment orchestration service 156 the electronic envelope status 148 of any stuffed electronic envelopes 144*b* sent from the EROs 106 to the taxpayers 110, and generates and sends the ERO credentials 146 to the electronic signature/payment orchestration service 156. The electronic signature computer 120 comprises a user account database 174 that stores credentials that allows the EROs 106 to access the third party electronic signature service 170, stores the documents associated with each stuffed electronic envelope 144*b* received from an ERO 106, and stores status information regarding all electronic envelopes 144.

Because the electronic signature/payment orchestration service 156 and the third party electronic signature service 170 are managed by separate entities, an application programming interface (API) may be used to facilitate communication between the electronic signature/payment orchestration service 156 and the third party electronic signature service 170 to allow the EROs 106 and taxpayers 110 to seamlessly utilize the third party electronic signature service 170 and to allow the electronic signature/payment orchestration service 156 to obtain status of the electronic signature and payment from the third party electronic signature service 170.

Figure 2D:
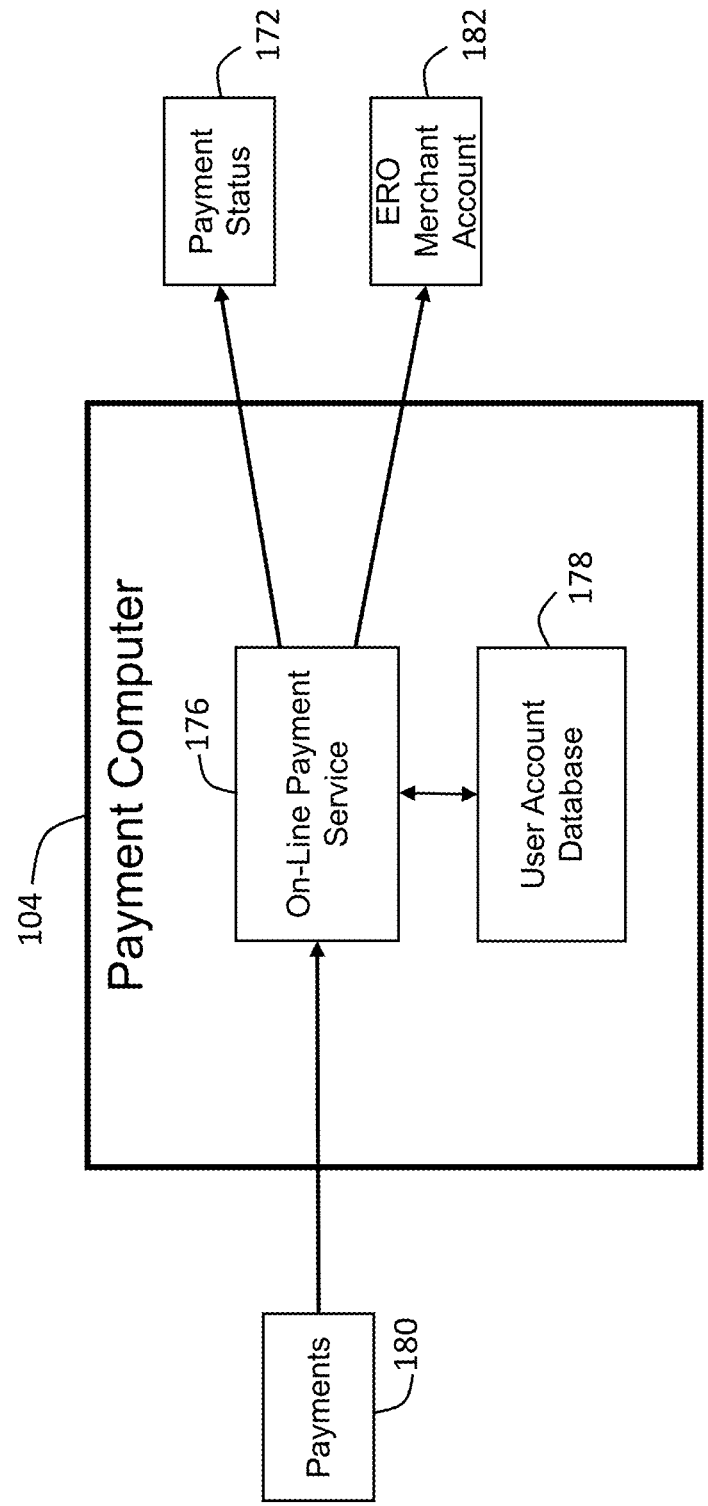
FIG. 2d is a block diagram of an on-line payment computer used in the electronic tax return filing system of FIG. 1.

Referring to FIGS. 1 and 2*d*, in the illustrated embodiment, actual payments from the taxpayers 110 to the ERO 106 are made through an on-line payment service (or software module) 176 that resides on a payment computer 124 managed by a host 126. In the illustrated embodiment described herein, the on-line payment service 176 is QUICKBOOKS managed by Intuit, Inc. However, the on-line payment service 176 may alternatively be PAYPAL managed by PayPal, Inc. To this end, the payment service 176 receives payments 180 from the taxpayers 110, and sends the payments 180 to ERO merchant accounts 182. The payment service 176 also sends the payment status 172 to the third party electronic signature service 170. The payment computer 124 comprises a user account database 178 that stores credentials that allows the EROs 106 to receive payments from the taxpayer 110 via the on-line payment service 176, and further stores payment information made by the taxpayers 110 to the EROs 106.

For communication purposes, the ERO computers 105 and intermediary computer 112 are operably coupled to or in communication with each other through a network 128*a*; the ERO computers 105 and third party electronic signature computer 120 are operably coupled to or in communication with each other through a network 128*b*; the intermediary computer 112 and tax authority computer 108 are operably coupled to or in communication with each other through a network 128*c*; the third party electronic signature computer 120 and taxpayer computers 108 are operably coupled to or in communication with each other through a network 128*d*; the third party electronic signature computer 120 and payment computer 124 are operably coupled to or in communication with each other through a network 128*f*; and the taxpayer computers 108 and payment computer 124 are operably coupled to or in communication with each other through a network 128*g*.

Each of the networks 128*a-e* and other networks discussed herein (generally, network 128) may be different, or two or more networks 128 may be the same depending on the system configuration and communication protocols employed. One or more or all of the networks 128 may be, for example, a wireless or cellular network, a Local Area Network (LAN) and/or a Wide Area Network (WAN). Reference to a network 128 generally is not intended to refer to a specific network or communications protocol, and embodiments can be implemented using various networks 128 and combinations thereof.

Figure 3:
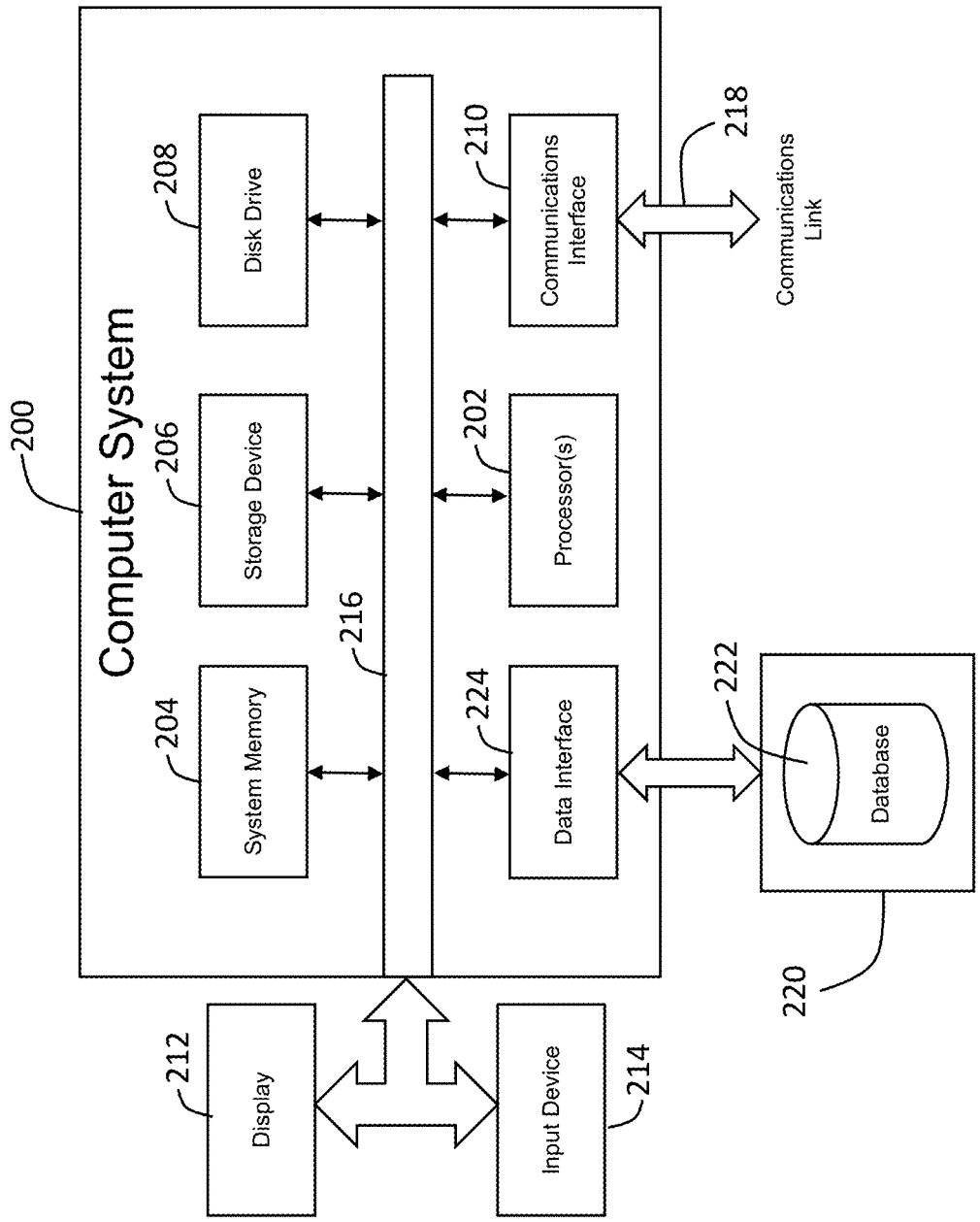
FIG. 3 is a computer system that can be implemented by any of the computer illustrated in FIGS. 2a-2d.

Referring now to FIG. 3, a block diagram of components of an illustrative computing system 200 suitable for implementing an embodiment of the ERO computer 104, taxpayer computer 108, intermediary computer 112, tax authority computer 116, and third party electronic signature computer 120 will be described. The computing system 200 includes one or more processors 202, system memory 204 (e.g., RAM), static storage device 206, disk drive 208 (e.g., magnetic or optical), wireless communication interface 210 (e.g., modem or Ethernet card), display 212 (e.g., LRT or LCD), input device 214 (e.g., keyboard and cursor control device), and a bus 216 or other communication mechanism for interconnecting these components. The processor(s) 202 may execute one or more sequences of one or more instructions contained in system memory 204. Such instructions may be read into system memory 204 from another computer readable/usable storage medium, such as static storage device 206 or disk drive 208.

The computer system 200 may transmit and receive messages, data, and instructions, including program, i.e., application code, through the communication interface 210 and a communications link 218. Received program code may be executed by processor 202 as it is received, and/or stored in disk drive 208, or other non-volatile storage for later execution. The computer system 200 may in conjunction with a data storage system 220, e.g., a data storage system 220 that contains a database 222, that is readily accessible by the computer system 200. The computer system 200 communicates with the data storage system 220 through a data interface 224. The data interface 224, which is coupled to the bus 216, transmits and receives electrical, electromagnetic or optical signals that include data streams representing various types of signal information, e.g., instructions, messages and data. The functions of the data interface 224 may be performed by the communication interface 210.

In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention. The processor(s) 202 may be used to perform various actions such as various actions, processes, or modules involving determining, analyzing, performing actions, etc. The components and services described herein, such as the tax preparation component 136

The term "computer readable storage medium" or "computer usable storage medium" as used herein refers to any non-transitory medium that participates in providing instructions to the processor(s) 202 for execution. Such a medium may take many forms, including but not limited to, non-volatile media and volatile media. Non-volatile media includes, for example, optical or magnetic disks, such as the disk drive 208. Volatile media includes dynamic memory, such as the system memory 204.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

Having described the structure and function of the electronic tax return filing system 100, one method 300 of using the electronic tax return filing system 100 to prepare a tax return for a taxpayer 110, collect an electronic signature and payment from a taxpayer 110, electronically file the tax return 132, and close the invoice from the ERO 106 to the taxpayer 110 will now be described. First, in a conventional manner, the ERO 106 launches the tax preparation program 130 (step 302), attempts to log into the tax preparation program 130 (step 304), and in response, the tax preparation program 130 determines whether the ERO 106 has a valid license to use the tax preparation program 130 to prepare and file tax returns 132 for taxpayers 110 by checking the login credentials in the ERO account database 142 of the ERO computer 104 or requesting the intermediary computer 108 to check the ERO account database 158 (step 306).

If a valid license for the ERO 106 to use the tax preparation program 130 does not exist, the tax preparation program 130 returns an error message (step 308). If a valid license for the ERO 106 to use the tax preparation program 130 does exist, the ERO 106 is allowed to use the tax preparation program 130 to prepare the tax return 132 for the taxpayer 110, or if the tax return 132 has already been prepared for the taxpayer 110, retrieve the tax return 132 from the tax database 138 (step 310).

The electronic signature and optional payment collection functions are incorporated within the tax preparation program 130 used to prepare the tax return 132, thereby providing the ERO 106 with a fully integrated experience. To this end, after the tax return 132 has been prepared or retrieved and is ready to be transmitted to the taxpayer 110, the ERO 106 selects an option in the tax preparation program 130 to utilize the electronic signature/payment orchestration service 156 to electronically collect a signature (step 312). Although the ERO 106 in method 300 is illustrated and described as preparing the tax return 132 and selecting the option to utilize the electronic signature/payment orchestration service 156 during a single login into the tax preparation program 130, it should be appreciated that the tax return 132 may be prepared or retrieved during one login into the tax preparation program 130, and the option to utilize the electronic signature/payment orchestration service 156 may be selected during another separate login into the tax preparation program 130.

At this point, the ERO 106 may have already signed up with the electronic/payment orchestration service 195 on a trial basis, a purchase basis, or "billing in arrears" basis (i.e., billed on a monthly basis after usage), and either via the telephone or on-line through the tax preparation program 130. The ERO 106 may provide a graphical user interface that allows the ERO 106 to purchase incremental usage of the electronic/payment orchestration service 195 in the form of envelopes purchased.

Figure 6A:
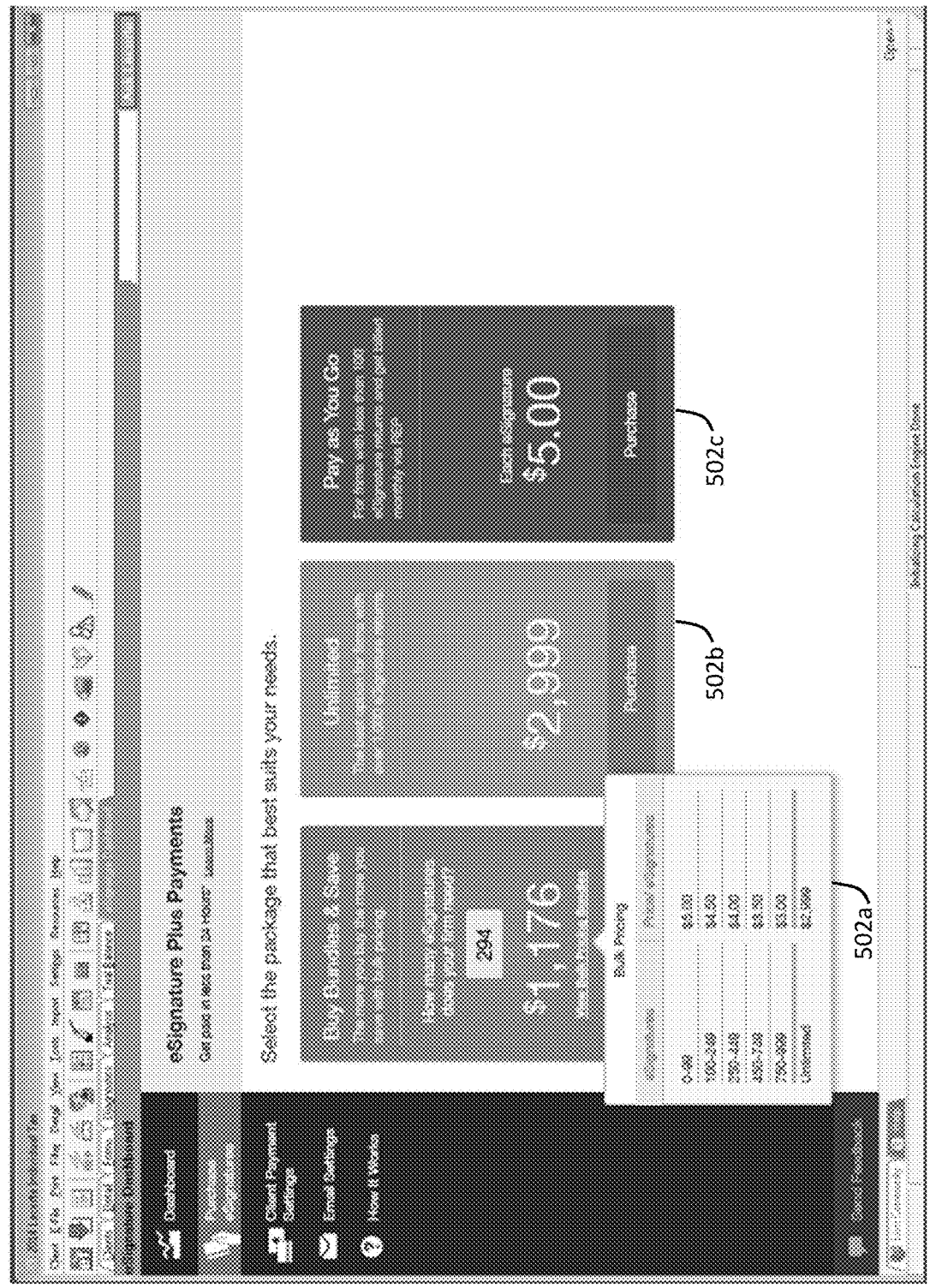
FIGS. 6a-6b are plan views of screens that can be displayed by the system of FIG. 1 to an ERO to purchase envelopes.
Figure 6B:
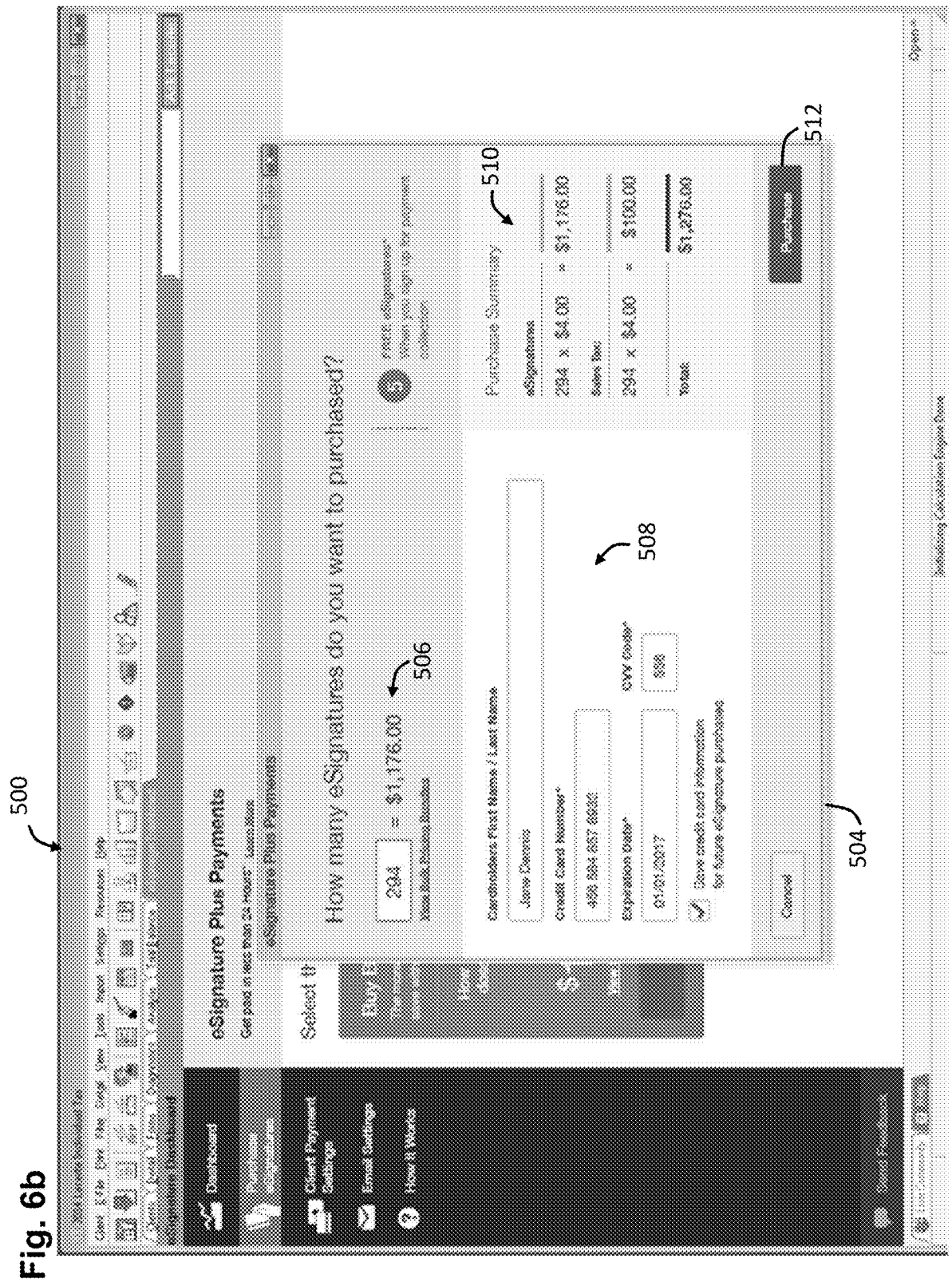

For example, with reference to FIG. 6*a*, an envelope purchase option screen 500 that allows an ERO 106 to select different options for purchasing envelopes will now be described. As there shown, the ERO 106 may select a bulk purchase option 502*a*, which allows the ERO 106 to purchase envelopes at a bulk rate that incrementally gets cheaper per envelope with the number of purchased envelopes. The ERO 106 may select the unlimited purchase option 502*b*, which allows the ERO 106 to purchase an unlimited number of envelopes at a fixed price. The ERO 106 may select the billing option 502*c*, which allows the ERO 106 to purchase each envelope on an individual basis and be billed later in arrears. A purchase window may be displayed in response to selection of one of the purchase options 502 for allowing the ERO 106 to actually purchase the envelopes. For example, with reference to FIG. 6*b*, a purchase pop-up window 504 is displayed in response to selection of the bulk purchase option 502*a*. The purchase window 504 includes a field 506 that allows the ERO 106 to enter the number of envelopes to be purchased, a credit card area 508 that allows the ERO 106 to enter credit card information for purchasing the envelopes, a purchase summary 510 indicating the cost break down for the envelope purchase, and a graphical purchase button 512 that can be clicked or otherwise actuated to execute the customized envelope purchase.

Figure 7A:
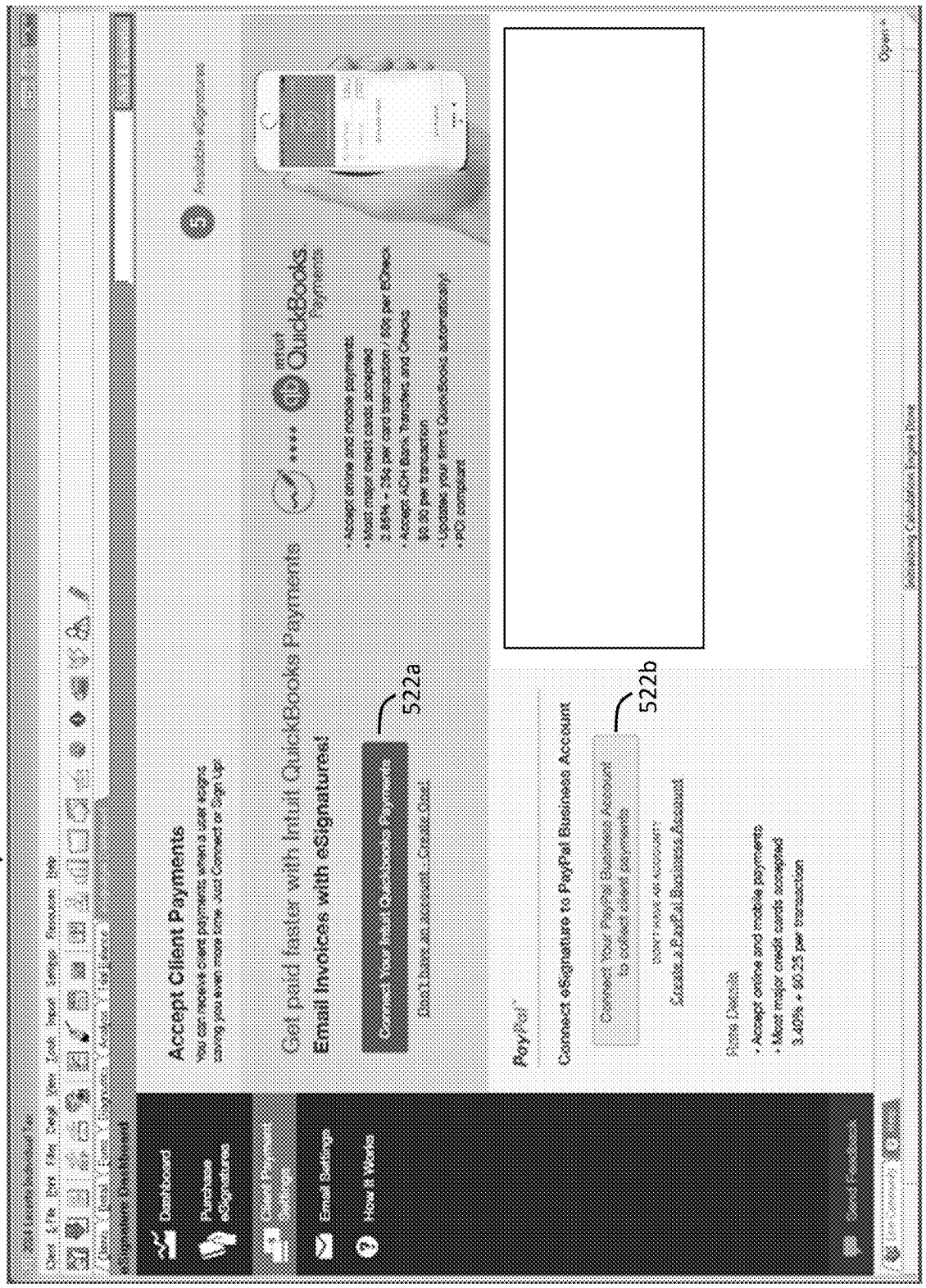
FIGS. 7a-7c are plan views of screens that can be displayed by the system of FIG. 1 to an ERO to connect an on-line payment service to an electronic signature/payment orchestration service.

The ERO 106 may also connect a payment account that the ERO 106 has with the on-line payment service 176 to the e-sign account that the ERO 106 has with the electronic signature/payment orchestration service 156 for electronically receiving payments from taxpayers 110 into a merchant account 182 (e.g., bank account) via the on-line payment service 176. The electronic signature/payment orchestration service 156 may provide a graphical user interface for connecting the on-line payment service account with the electronic signature/payment orchestration service 182. For example, with reference to FIG. 7*a*, on-line payment service option selection screen 520 may be displayed to the ERO 160 to allow selection of one of two different on-line payment service options 176 for which to collect payment from taxpayers 110, in this case, either QUICKBOOKs payments 522*a* or Paypal payments 522*b*.

Figure 7B:
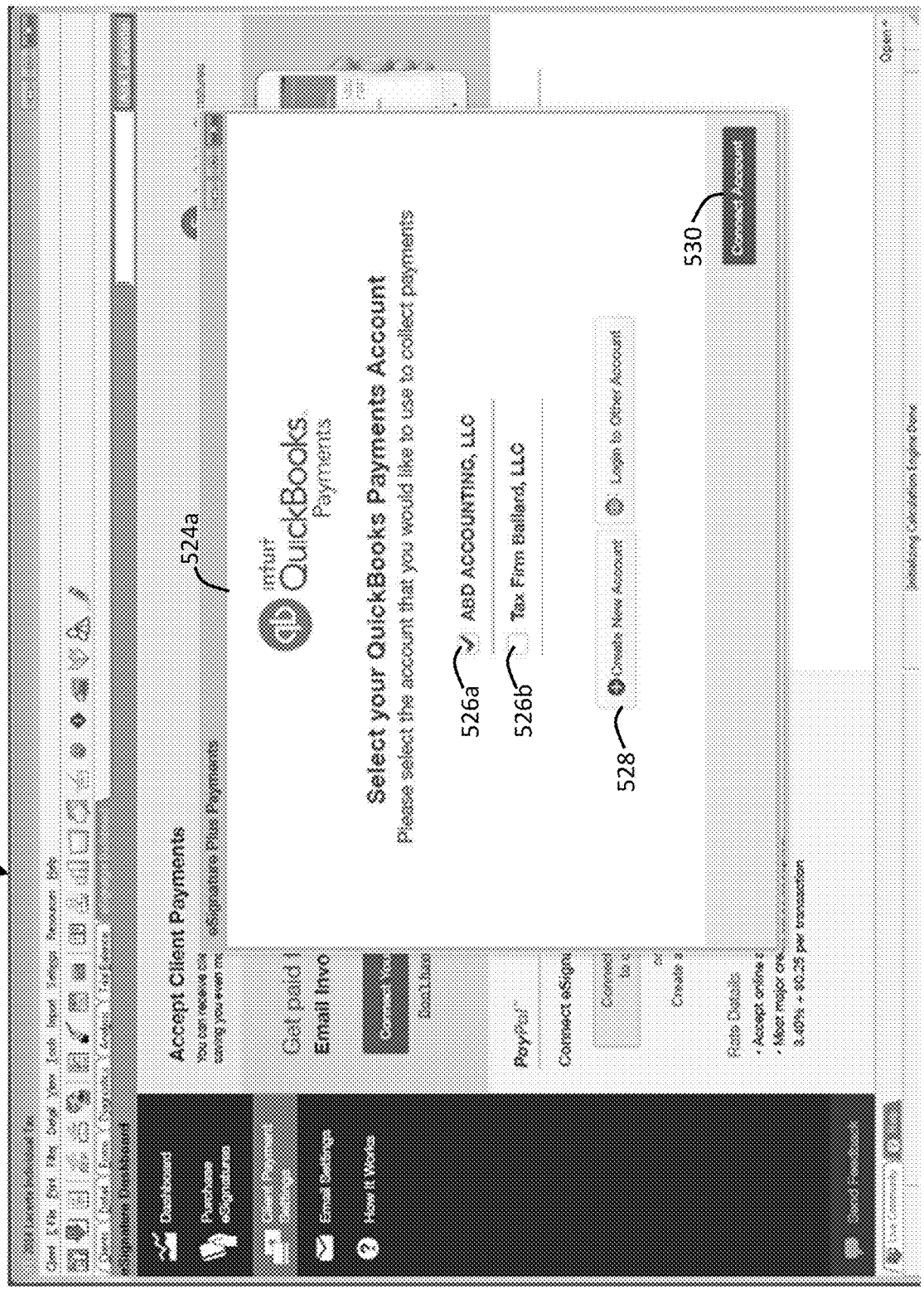

Selection of the QUICKBOOKs payment option 522*a* displays a QUICKBOOKs account selection pop-up window 524*a* that allows the ERO 106 to select between one of a plurality of different QUICKBOOK payment accounts (in this case, two) via check boxes 526*a*, 526*b*, as illustrated in FIG. 7*b*. The pop-up window 524*a* further comprises a graphical new account button 528 that can be clicked or otherwise actuated to create another QUICKBOOKs payment account from which to select for collection of payments from the taxpayer 110. The pop-up window 524*a* further comprises a graphical connect button 530 that can be clicked or actuated to connect the selected QUICKBOOKs payment account, and thus, the merchant account 182 associated with that payment account, to the electronic signature/payment orchestration service 156.

Figure 7C:
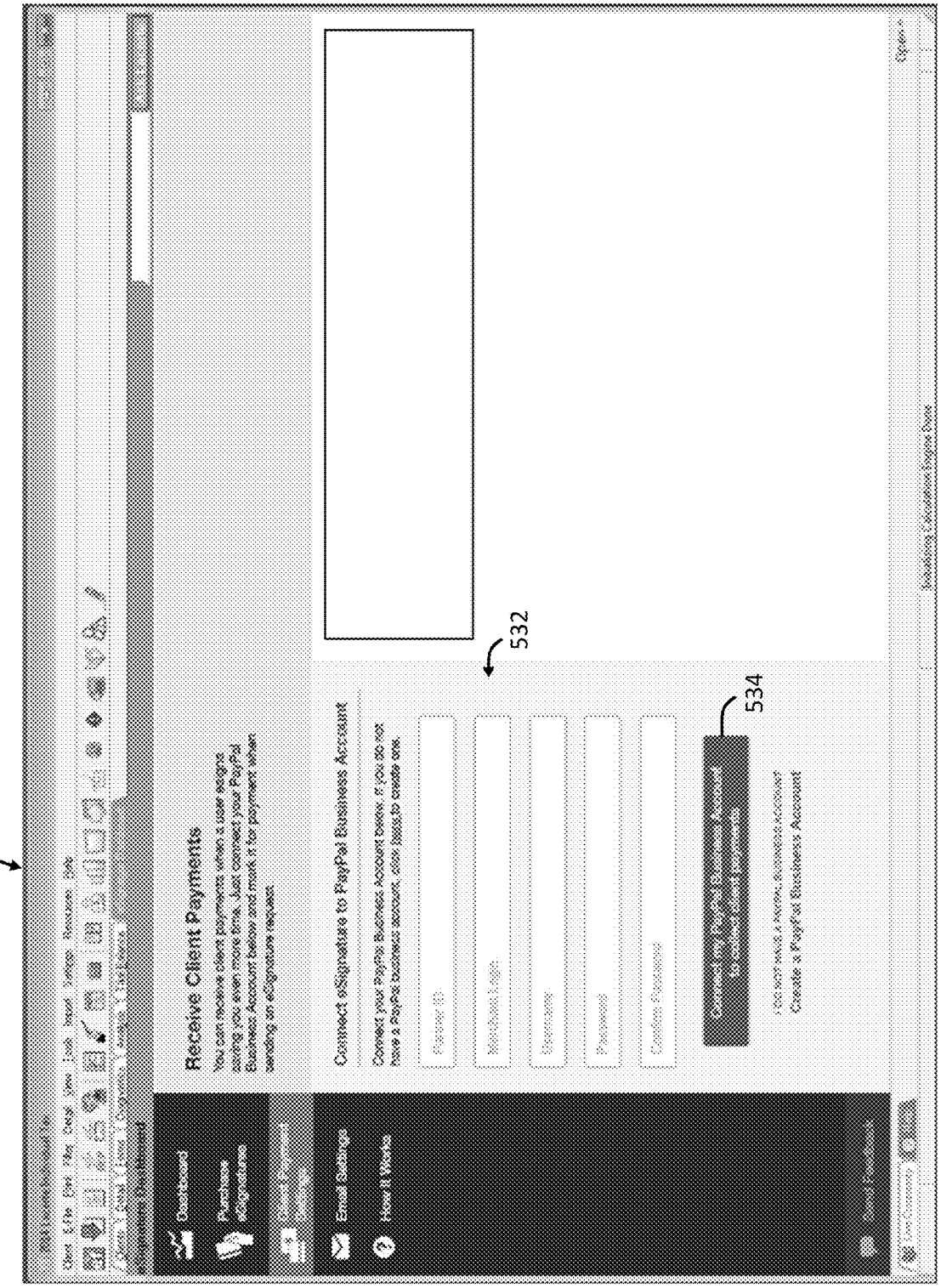

As illustrated in FIG. 7*c*, selection of the Paypal payment option 522*b* displays a Paypal account selection pop-up window 524*b* that allows the ERO 106 to enter Paypal login information via a set of fields 532, and a graphical connect button 534 that can be clicked or actuated to connect the Paypal payment account, and thus, the merchant account 182 associated with that payment account, to the electronic signature/payment orchestration service 156.

It can be appreciated from the foregoing that the electronic signature/payment orchestration service 156 allows the ERO 106 to transparently set up an e-sign account and purchase envelopes for use with the third party electronic signature service 170, as well as set up a payment account with the third party payment service 176, using a login to the existing account that the ERO 106 has with the tax return filing service 192.

Figure 4:
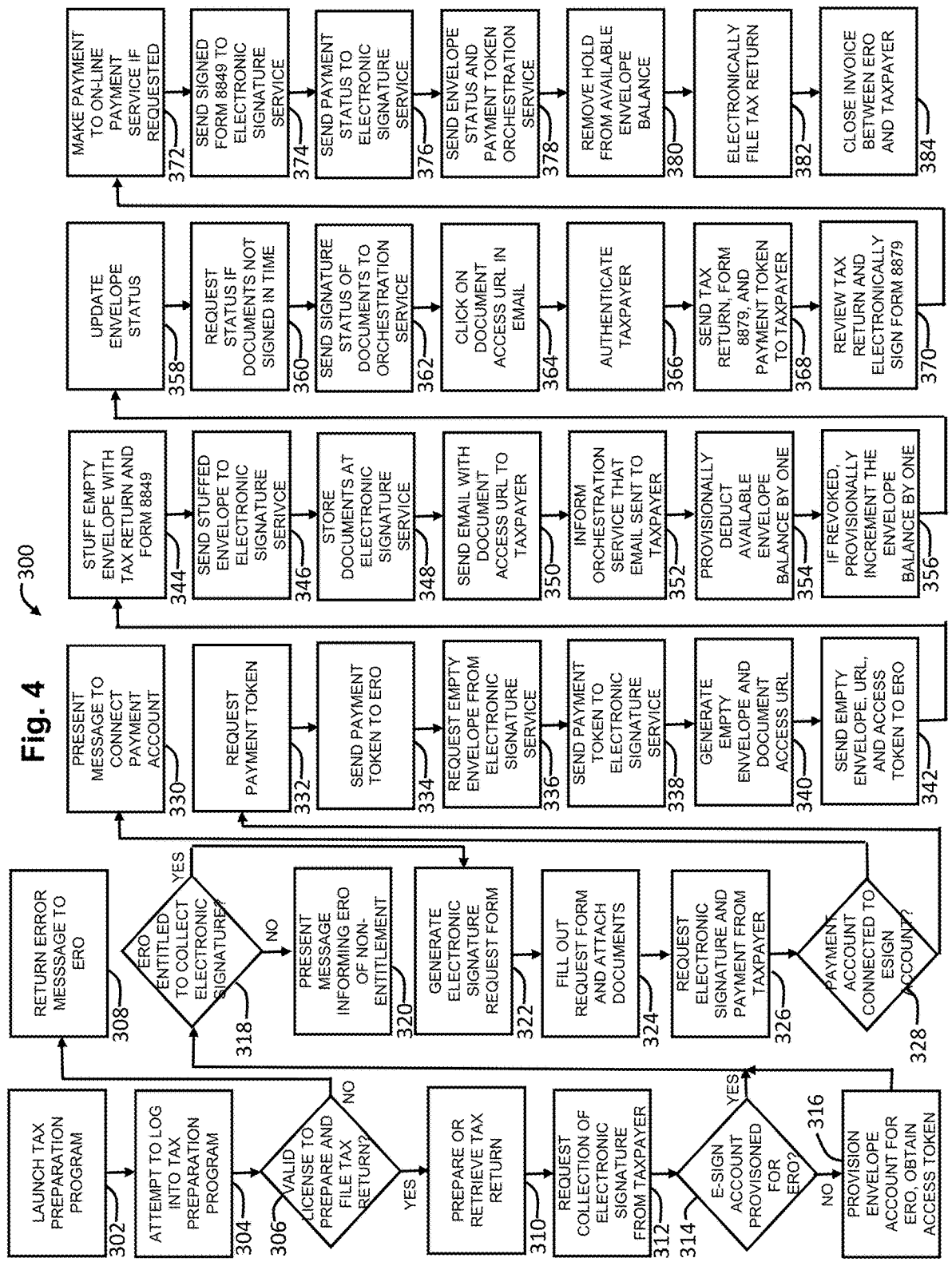
FIG. 4 is a flow diagram illustrating one method performed by the system of FIG. 1 to prepare an electronic tax return, collect an electronic signature and payment from a taxpayer, file the electronic tax return with the tax authority, can close an invoice between the ERO and taxpayer.
Figure 5:
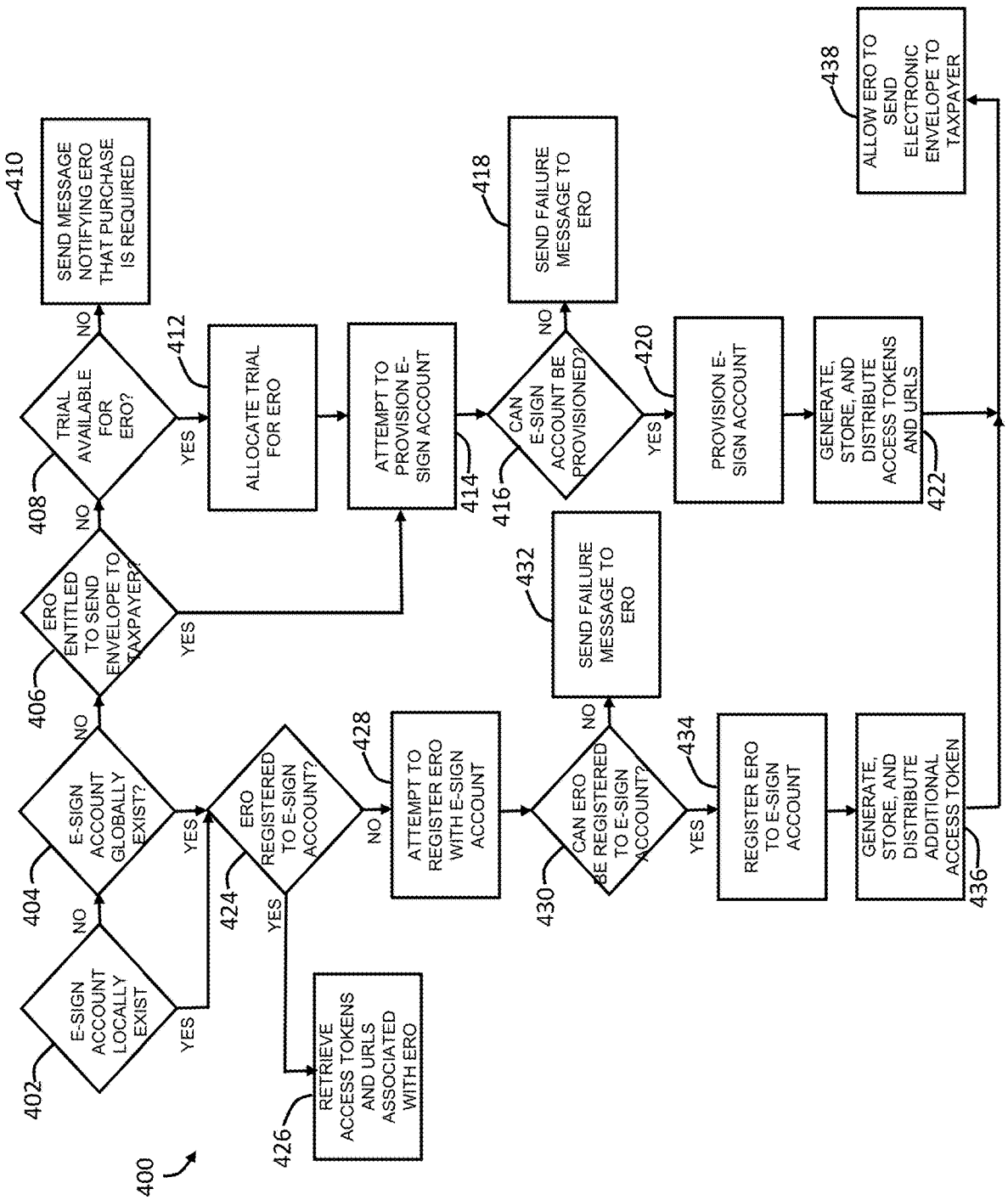
FIG. 5 is a flow diagram illustrating one method performed by the system of FIG. 1 to provision an e-sign account for the ERO with an electronic signature service.

Returning to FIG. 4, in response to selecting the option to collect the electronic signature from the taxpayer 110, it is determined whether the ERO 106 has an electronic signature account ("e-sign" account) (step 314). In particular, the electronic signature component 140 of the tax preparation program 130 and/or the electronic signature/payment orchestration service 156 determines whether an "e-sign" account for the ERO 106 has been provisioned with the third party electronic signature service 170.

If an e-sign account for the ERO 106 with the third party electronic signature service 170 has not been provisioned, the electronic signature/payment orchestration service 156 so provisions the e-sign account (step 316). Included with provisioning the e-sign account is the acquisition of an access token, which will be used by the electronic signature component 140 of the tax preparation program 130 and/or the electronic signature/payment orchestration service 156 to access the on-line payment service 176. Once obtained, the access token for the ERO 106 is stored in the user account database 174 of the electronic signature computer 200. As will be described in further detail below, the access token is correlated to a user account at the third party electronic signature service 170 under which documents, payment tokens, invoice amounts, and other information associated with the ERO 106 are stored.

The e-sign account can be checked and provisioned with the third party electronic signature service 170 in any variety of manners. For example, referring to FIG. 4, one method 400 of provisioning an e-sign account for an ERO 106 at a multi-ERO company/firm 102 will now be described. It is initially noted that even through the company/firm 102, in general, may have an e-sign account with the third party electronic signature service 170, that e-sign account may not locally reside on a particular ERO computer 102 at that company/firm 102, and/or the ERO 106 attempting to send electronic envelopes from that ERO computer 102 may not be registered with that e-sign account. Thus, each ERO computer 102 at that company/firm 102 that connects with the electronic signature/payment orchestration service 156 must be locally checked for a company/firm e-sign account, and each ERO 106 at that company/firm 102 must be registered with the company/firm e-sign account in order to use the electronic signature/payment orchestration service 156.

In other words, a company/firm e-sign account that does not locally reside on an ERO computer 102 at the company/firm 102 must be locally stored on that ERO computer 102 even if another ERO computer 102 at the company/firm 102 has the e-sign account, and an ERO 106 at the company/firm 102 that is not registered with the e-sign account must be so registered even if another ERO 106 at the company/firm 102 is registered with the e-sign account. Furthermore, it is entirely possible that a ERO computer 102 that previously had a company/firm e-sign account may no longer have that e-sign account for any one of a variety of reasons, such as reformatting the hard drive on the ERO computer 102.

To this end, it is first determined whether a company/firm e-sign account with the third party electronic signature service 170 locally resides on the ERO computer 102 (step 402). For example, the tax preparation program 130 may request the electronic signature component 140 to locally check the ERO computer 102 for the existence of a company/firm e-sign account with the third party electronic signature service 170, and, in response, the electronic signature component 140 may then check the ERO account database 142 of the ERO computer 102 for the existence of the company/firm e-sign account.

If a company/firm e-sign account does not locally exist on the ERO computer 102, it is then determined whether a company/firm e-sign account with the third party electronic signature service 170 globally exists, i.e., whether it exists on the intermediary computer 112 (step 404). For example, the electronic signature component 140 may request the electronic signature/payment orchestration service 156 to provision an e-sign account for the company/firm 102, in response to which the electronic signature/payment orchestration service 156 first checks the ERO account database 158 residing on the intermediary computer 112 for the company e-sign account with the third party electronic signature service 170.

If a company/firm e-sign account with the third party electronic signature service 170 does not globally exist, it is determined whether the ERO 106 is entitled to send an electronic envelope 144 to the taxpayer 112 (step 406). For example, the electronic signature/payment orchestration service 156 may check the ERO billing service 162 to determine if the ERO 106 is entitled to send an electronic envelope 144 to the taxpayer 112. It is noted that even through an e-sign account for the company/firm 102 may not exist, the ERO 106 may nonetheless be entitled to use stuff and send electronic envelopes. For example, a representative of the company/firm 102 may have signed up for the electronic signature/payment orchestration service 156 and purchased a number of electronic envelopes or opted to be billed in arrears, in which case, the company/firm 102 would be entitled to send electronic envelopes to taxpayers 110 via the third party electronic signature service 170. However, if the representative of the company/firm 102 signed up for the electronic signature/payment orchestration service 156 over the phone, a computer account may not yet be set up or the company/firm 102; i.e., there may not be an e-sign account associated with that company/firm 102 in the ERO account database 158 residing on the intermediary computer 112.

If the ERO 106 is not entitled to use the electronic signature/payment orchestration service 156 at step 406 (e.g., because the company/firm did not purchase envelopes or select to be billed in arrears), it is determined whether a trial is available to the ERO 406 (step 408). For example, the electronic signature/payment orchestration service 156 may check the ERO account database 158 to determine whether a trial is available to the company/firm 102, and thus the ERO 106. A trial will generally be available to the company/firm 102 if a trial has never been previously allocated to the company/firm 102. If a trial is not available to the company/firm 102, a message notifying the ERO 104 that the company/firm 102 must make an electronic envelope purchase is sent to the ERO 104 (step 410). For example, the electronic signature/payment orchestration service 156 may notify the electronic signature component 140 of the tax preparation program 130, which in turn, may notify the ERO 104 that he or she must make an envelope purchase in order to send an electronic envelope 144 to the taxpayer 110.

If a trial is available to the company/firm 102, a new trial is allocated to the company/firm 102 (step 412). For example, the electronic signature/payment orchestration service 195 may assign a number of trial envelopes to the company/firm 102 and store the number in the ERO account database 158. The electronic signature/payment orchestration service 195 may also set the validity of the trial for a predetermined period of time (e.g., ninety days).

If the ERO 106 is entitled to use the electronic signature/payment orchestration service 156 at step 406 or if a trial is otherwise available to the ERO 106 at step 408, an e-sign account for the company/firm 102 is attempted to be provisioned with the third party electronic signature service 170 (step 414). For example, the electronic signature/payment orchestration service 156 may request to provision an e-sign account for the company/firm 102 with the third party electronic signature service 170, which request may include providing the third party electronic signature service 170 with the name and email address of the ERO 106.

If an e-sign account for the company/firm 102 cannot be provisioned with the third party electronic signature service 170 (step 416), a failure message is presented to the ERO 106 (step 418). For example, the third party electronic signature service 170 may send a failure message to the electronic signature/payment orchestration service 156, which forwards the failure message to the electronic signature component 140 of the tax preparation program 130. Reasons for failing to provision an e-sign account for the ERO 106 may include, e.g., communication problems between the electronic signature/payment orchestration service 156 and the third party electronic signature service 170, the existence of a previous account of the ERO 106 at the third party electronic signature service 170 based on the combination of name and email address of the ERO 106, etc.).

If an e-sign account for the company/firm 102 can be provisioned with the third party electronic signature service 170 (step 416), an e-sign account for the company/firm 102 is then provisioned with the third party electronic signature service 170, with the ERO being attached to the e-sign account, including personal name and login information used to access and use the tax preparation program 130 (step 420). An access token is then generated by the third party electronic signature service 170, stored, and distributed to the electronic signature/payment orchestration service 156, one access token for each ERO 130 associated with the account of the company/firm 102 (step 422).

For example, the third party electronic signature service 170 may generate access tokens, and store, in association with the newly provisioned e-sign account, the name and email address of each ERO 106 and the newly generated access tokens in the user account database 174 residing on the electronic signature computer 200, and then send the access tokens to the electronic signature/payment orchestration service 156, where they are stored in the ERO account database 158 residing on the intermediary computer 112. The electronic signature/payment orchestration service 156 then sends one of the access tokens to the electronic signature component 140 of the tax preparation program 130, where is stored in the ERO account database 142 residing on the ERO computer 102. Each access token is used as a credential to allow the ERO 106 to use the third party electronic signature service 170. Each access token is unique to each ERO 106, and thus, the electronic signature/payment orchestration service 156 stores one access token in the ERO account database 158 in association with each ERO 106 that is currently registered on the e-sign account for the company/firm 102.

If a company/firm e-sign account with the third party electronic signature service 170 globally exists (i.e., it resides on the intermediary computer 112) at step 404, it is determined whether the ERO 106 is registered with that e-sign account (step 424). For example, the electronic signature/payment orchestration service 156 may check the ERO account database 158 on the intermediate computer 112 to determine whether the ERO 106 is attached to the company/firm e-sign account.

If the ERO 106 is registered with the company/firm e-sign account, the electronic signature/payment orchestration service 156 retrieves the access token associated with that ERO 106 from the ERO database 190 residing at the intermediary computer 112, and sends the access token to the electronic signature component 140 for storage in the ERO database 142 of the ERO computer 102 (step 426).

If the ERO 106 is not registered with the company/firm e-sign account, registration of the ERO 106 with the company/firm e-sign account is then attempted (step 428). For example, the electronic signature component 140 of the tax preparation program 130 may send a request to the electronic signature/payment orchestration service 156 to register the ERO 106 with the company/firm e-sign account, and in turn, the electronic signature/payment orchestration service 156 may send a request to the third party electronic signature service 170 to register the ERO 106 with the company/firm e-sign account.

If the ERO 106 cannot be registered with the company/firm e-sign account (step 430), a failure message is presented to the ERO 106 (step 432). For example, the third party electronic signature service 170 may send a failure message to the electronic signature/payment orchestration service 156, which forwards the failure message to the electronic signature component 140 of the tax preparation program 130.

If the ERO 106 can be registered with the company/firm e-sign account (step 430), the ERO 106 is then registered with the company/firm e-sign account, which includes adding the personal name and login information used by the ERO 106 to access and use the tax preparation program 130 (step 434). An additional access token is then generated by the third party electronic signature service 170 and stored in association with the third party electronic signature service 170, electronic signature/payment orchestration service 156, and electronic signature component 140 of the tax preparation program 130 (step 436).

For example, the third party electronic signature service 170 may generate an access token, and store, in association with the e-sign account, the name and email address of the ERO 106 and the newly generated access token in the user account database 174 residing on the electronic signature computer 200, and then send the access token to the electronic signature/payment orchestration service 156, where it is stored in the ERO account database 158 residing on the intermediary computer 112. The electronic signature/payment orchestration service 156 then sends the access token to the electronic signature component 140 of the tax preparation program 130, where it is stored in the ERO account database 142 residing on the ERO computer 102.

If a company/firm e-sign account with the third party electronic signature service 170 locally resides on the ERO computer 102 at step 402, it is then determined whether the ERO 106 is registered with that e-sign account (step 424). For example, the electronic signature component 140 of the tax preparation program 100 may check the ERO account database 142 on the ERO computer 102 to determine whether the ERO 106 is attached to the company/firm e-sign account.

If the ERO 106 is not attached to the company/firm e-sign account at step 424, the ERO 106 is registered to the e-sign account in the manner described above with respect to steps 426-436. If the ERO 106 is attached to the company/firm e-sign account, or after the company/firm e-sign account has been provisioned and the ERO 106 registered to that e-sign account, the ERO 106 will be allowed to send electronic envelopes 144 to taxpayers 110 via the third party electronic signature service 170 (step 438).

Referring back to FIG. 2, if the e-sign account has already been provisioned at step 314, or after the e-sign account have been provisioned at step 316, the electronic signature/payment orchestration service 156 determines whether the ERO 106 is entitled to collect an electronic signature from the taxpayer 110 by accessing the ERO entitlement database 160 (step 318). For example, the electronic signature/payment orchestration service 156 may check the trial balance in the ERO entitlement database 160 to determine if the ERO 106 is entitled to any available free uses (e.g., up to five may be available for each firm or company to be used within ninety days of signing up for the service). If no free trial uses are available, the electronic signature/payment orchestration service 156 may check the purchase balance in the ERO entitlement database 160 to determine whether the ERO 106 is entitled to any available purchased uses, taken into account any outstanding electronic envelopes that have been sent to the taxpayer 110 but have not been completed. If no free trial uses or purchase uses are available, the electronic signature/payment orchestration service 156 checks the ERO entitlement database 160 to determine whether the ERO 106 has agreed to be billed in arrears.

If the ERO 106 is not entitled to collect an electronic signature from the taxpayer 110, the electronic signature/payment orchestration service 156 transmits a message to the electronic signature component 140 informing the ERO 106 of the non-entitlement, e.g., by informing the ERO 106 that the account balance in the ERO entitlement database 160 is at a zero and additional electronic envelopes need to be purchased or the option to be billed in arrears needs to be selected (step 320). It should be noted that the ERO 106 may request an available envelope balance at any time, in response to which the electronic signature/payment orchestration service 156 returns the available envelope balance. The outstanding envelopes will be taken into account in the returned available envelope balance.

Figure 8:
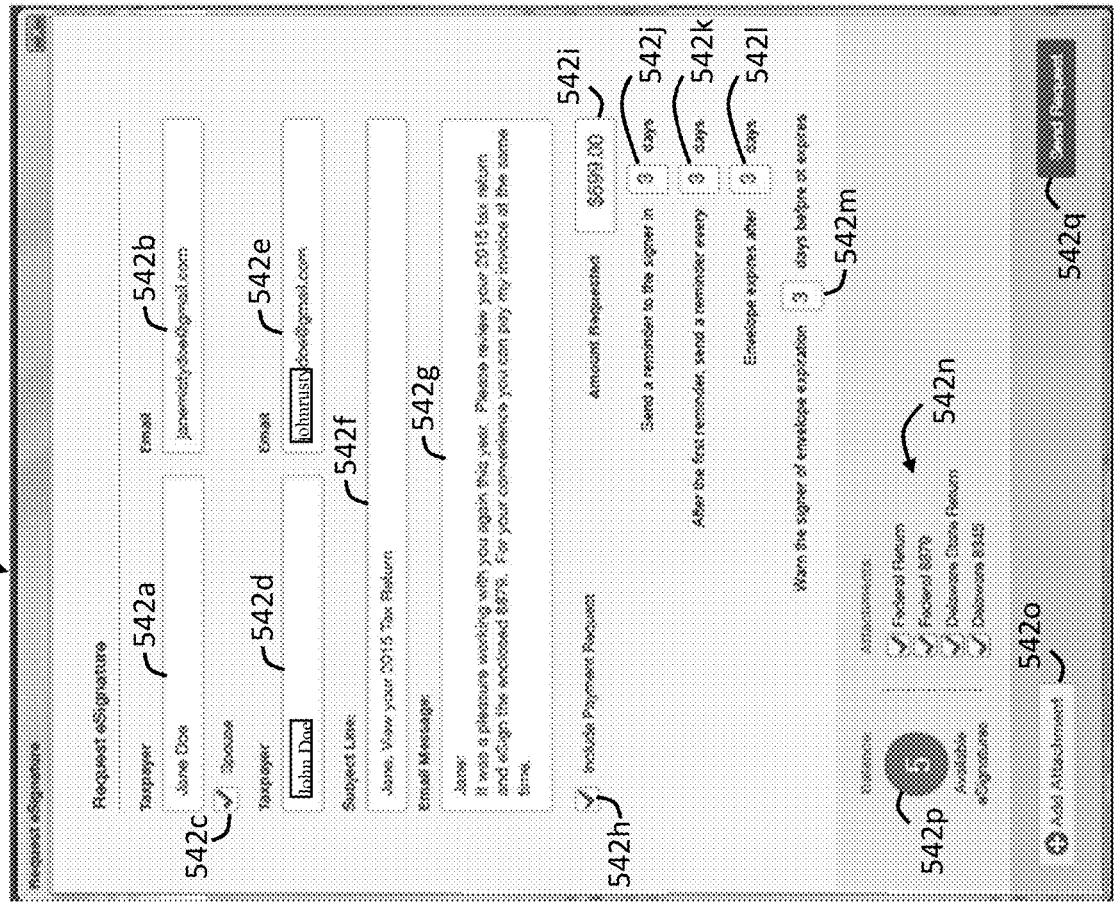
FIG. 8 is a plan view of an electronic signature request form that can be displayed by the system of FIG. 1 to an ERO to collect electronic signatures and optional payment from a taxpayer.

If the ERO 106 is entitled to collect an electronic signature from the taxpayer 110, the electronic signature component 140 of the tax preparation program 130 generates and displays an electronic signature request form 540 to the ERO 106 (step 322). The ERO 106 then fills out the electronic signature request form with the necessary information and attaches a number of documents to the electronic signature request form 540 (step 324). For example, as illustrated in FIG. 8, an electronic signature request form 540 comprises a first taxpayer name field 542a, a first taxpayer email field 542b, a spouse check box 542c, a second taxpayer name field 542d, a second taxpayer email field 542e, an email subject line field 542f, an email message field 542g, a payment request check box 542h, a payment amount request field 542i, an initial reminder field 542j specifying the number of days a reminder will be sent to the taxpayer, a subsequent reminder field 542k specifying the number of days a reminder will be repeatedly sent to the taxpayer, an envelope expiration field 542l specifying the number of days before the envelope expires, an expiration warning field 542m specifying the number of days a warning is sent to the taxpayer before expiration of the envelope, an attachment list 542n specifying the documents that have been attached to the electronic signature request form, a graphical attachment button 542o that can be clicked or otherwise actuated to individually attach a selected document to the electronic signature request form 540, an available envelope balance 542p specifying the number of envelope available to be sent to taxpayers (including trial and purchased envelopes), and a send request button 542q that can be clicked or otherwise actuated to request electronic signature and optional payment from the taxpayer 110.

In response to clicking or otherwise actuating the graphical send request button 542q on the electronic signature request form 540 (step 326), assuming that payment from the taxpayer 110 has been requested by the ERO 106 (i.e., the payment request check box 542h has been checked, and a non-zero value has been entered into the payment amount request field 542i), the electronic signature component 140 of the tax preparation program 130 determines whether a payment account of the ERO 106 with an on-line payment service 176 has been connected to the e-sign account that the ERO 106 has with the electronic signature/payment orchestration service 156 (step 328).

If a payment account for the ERO 106 has not been connected to the e-sign account for the ERO 106, the electronic signature component 140 of the tax preparation program 130 returns a message informing the ERO 106 that the payment account must be connected to the e-sign account (step 330). The graphical user interface 520 illustrated in FIGS. 7a-7c can be displayed to provide the ERO 106 the opportunity to connect a payment account to the e-sign account.

The electronic signature component 140 of the tax preparation program 130 then requests a payment token (step 332). In embodiment illustrated in FIG. 4, it is assumed that the on-line payment service 176 and electronic signature/payment orchestration service 156 are managed by the same host, a payment token (or other invoice identifier, such as user name, password, and invoice number) can be obtained from the same entity that hosts the electronic signature/payment orchestration service 15. For example, if the on-line payment service 176 is QUICKBOOK payments, and the electronic signature/payment orchestration service 156 is hosted by Intuit, Inc., then the payment token can be obtained from Intuit, Inc.

As such, the electronic signature component 140 may request the payment token from the taxpayer accounting service 154. For example, the electronic signature component 140 may send pertinent accounting information, such as email address of the ERO 106, email address of the taxpayer 110, phone number of ERO 106, invoice amount, and invoice identifier, to the electronic signature/payment orchestration service 156, which then forwards this information to the taxpayer accounting service 154. In response, the taxpayer accounting service 154 returns a payment token to the electronic signature component 140 of the tax preparation program 130 (step 334). For example, the taxpayer accounting service 154 may send the payment token to the electronic signature/payment orchestration service 156, which the forwards the payment token to the electronic signature component 140. In alternative embodiment, the electronic signature component 140 of the tax preparation program 130 may directly obtain the payment token from the taxpayer accounting service 154, in which case, the electronic signature/payment orchestration service 156 need not serve as an intermediary between the electronic signature component 140 and the taxpayer accounting service 154.

The electronic signature component 140 of the tax preparation program 130 then uses the access token to request an empty electronic envelope 144a from the third party electronic signature service 170 (step 336), and sends the payment token, along with all of the information entered by the ERO 106 into the electronic signature request form 540 illustrated in FIG. 8, to the third party electronic signature service 170 (step 338). For example, the electronic signature component 140 may retrieve the access token from the ERO account database 142, and send the access token, the payment token obtained from the taxpayer accounting service 154, and the request (along with all pertinent information) for an empty electronic envelope 144a to the electronic signature/payment orchestration service 156, which forwards this access token, payment token, and request to the third party electronic signature service 170.

In response, the third party electronic signature service 170 authenticates the ERO 106 using the access token, and assuming authentication, generates an empty electronic envelope 144a, provisions a "property bag" corresponding to an identification number of the empty electronic envelope 144a in the user account database 174, stores the payment token and pertinent information in the property bag, and generates a document access URL identifying the location of the property bag in the user account database 174 (step 340). The third party electronic signature service 170 then sends the empty electronic envelope 144a, along with the access token, URL, and envelope identification number, to the electronic signature component 140 of the tax preparation program 130 (step 342). For example, the third party electronic signature service 170 may generate the empty electronic envelope 144a, generate the document access URL, incorporate the document access URL and access token into the header of the empty electronic envelope 144a, and send the empty electronic envelope to the electronic signature/payment orchestration service 156, which then forwards the empty electronic envelope 144a, along with the access token and URL, to the electronic signature component 140 of the tax preparation program 130. Some or all of the pertinent information into the electronic signature request form 540 may be incorporated into the empty electronic envelope 144a prior to sending to the electronic signature component 140 of the tax preparation program 130, which can use or discard this information upon receiving the empty electronic envelope 144a.

Figure 9:
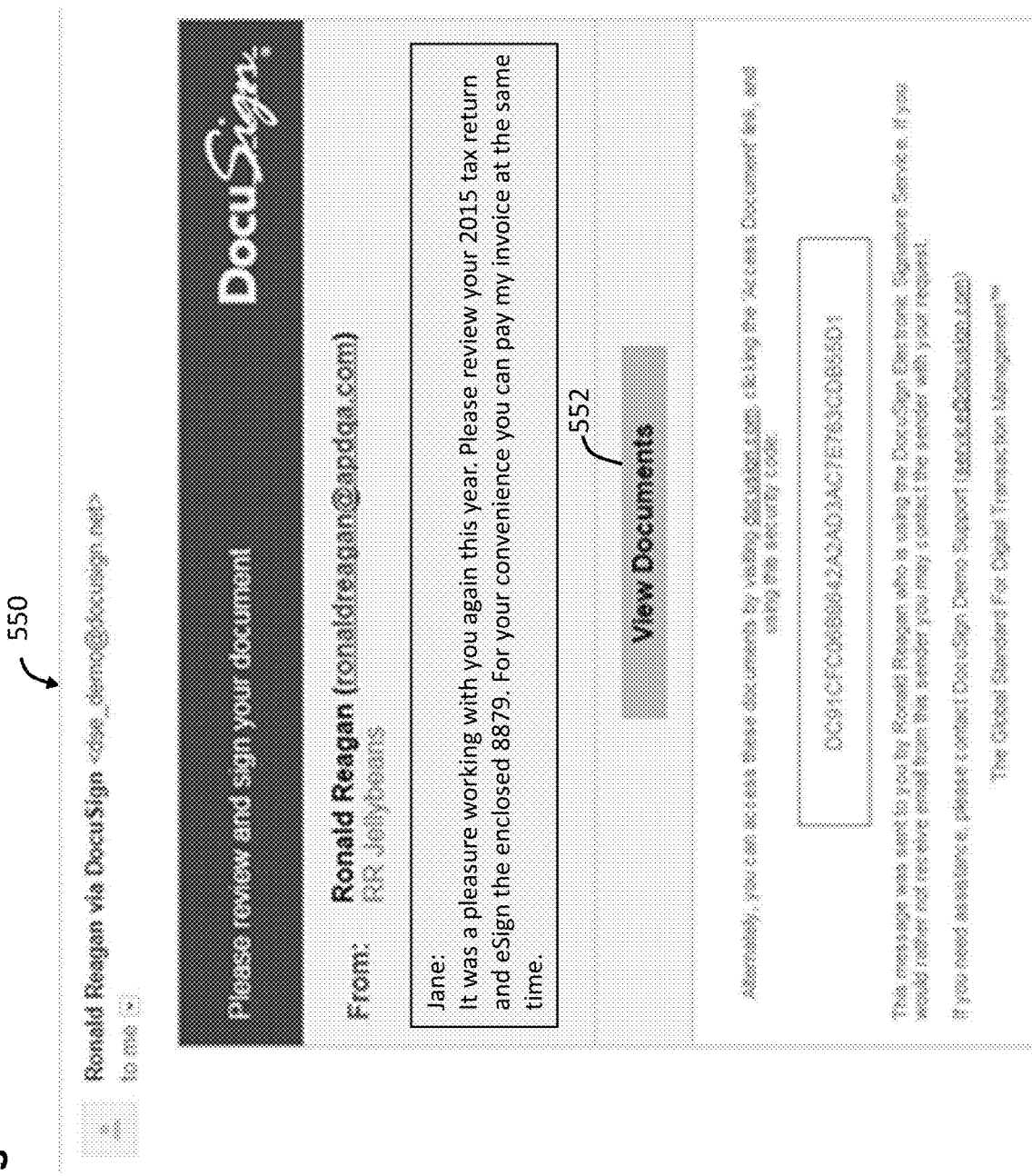
FIG. 9 is a plan view of an email that can be displayed by the system of FIG. 1 to the taxpayer to collect electronic signatures and optional payment from the taxpayer.

The electronic signature component 140 of the tax preparation program 130 then attaches the documents to the electronic envelope 144, resulting in a stuffed electronic envelope 144b (step 344), and transmits the stuffed electronic envelope 144b to the third party electronic signature service 170 (step 346), which authenticates the ERO 106 using access token, and assuming authentication, stores the documents in the property bag of the user account database 174 corresponding to the identification number of the stuffed electronic envelope 144b (step 348). The third party electronic signature service 170 then sends an email (such as the email 550 illustrated in FIG. 9), along with the document access URL, to the taxpayer 110 (step 350). The subject line and content of the email sent from the third party electronic signature service 170 to the taxpayer 110 will correspond to the subject and content information respectively entered by the ERO 106 into the fields 542f and 542g of the electronic signature request form 540 illustrated in FIG. 8. The third party electronic signature service 170 may retrieve this email information from the property bag for incorporation into the email sent to the taxpayer 110. The third party electronic signature service 170 then informs the electronic signature/payment orchestration service 156 that the email has been sent to the taxpayer 110 on behalf of the ERO 106 (step 352).

In response, the electronic signature/payment orchestration service 156 provisionally decrements the outstanding envelope from the available envelope balance ERO entitlement database 160 by one for the ERO 106 in the case where the ERO 106 is not billed in arrears (i.e., the ERO 106 has signed up for the electronic signature/payment orchestration service 156 on a trial basis or purchase basis) (step 354). That is, the available envelope balance will be provisional to the extent that a hold is placed on the balance for the outstanding envelope until there is a resolution on that electronic envelope, i.e., until the electronic signatures associated with that envelope have been collected, or the envelope is cancelled or revoked by the ERO 106. Thus, once an envelope is used (i.e., all required electronic signatures associated with that envelope are collected form the taxpayer 110), the envelope is permanently decremented from the available balance. If an unused envelope is removed or cancelled, the envelope is available balance is incremented. The ERO 106 can cancel or revoke the electronic envelope at any time as long as it is still outstanding and not completed, in which case, the electronic signature/payment orchestration service 156 will increment the available envelope balance ERO entitlement database 160 by one for the ERO 106 (step 356).

For example, assume that one hundred envelopes have been purchased, and twenty of those envelopes have been sent from the ERO 106 to the third party electronic signature service 170 for delivery of the attached documents to the taxpayer 110. Assume further that electronic signatures associated with ten of the twenty envelopes sent to the third party electronic signature service 170 have been collected, and the remaining 10 of the 20 envelopes sent to the third party electronic signature service 170 have not been collected (i.e., ten of the envelopes have been used). The envelope balance available to the ERO 106 (and all other EROs 106 in the company/firm 102) will be eighty. If one of the ten previously used envelopes is then used (i.e., signatures associated with that envelope have been collected), the available envelope balance will remain at eighty, but the envelope usage of ten will be incremented to eleven.

The electronic signature/payment orchestration service 156 also updates the electronic envelope status database 164 to reflect that a stuffed electronic envelope has been sent from the ERO 106 to the taxpayer 110 via the third party electronic signature service 170 (step 358). If the documents have not been electronically signed by the taxpayer 110 in a certain period of time (e.g., six hours), the electronic signature/payment orchestration service 156 will send a status request to the third party electronic signature service 170 (step 360), in response to which the third party electronic signature service 170 will send the status of the stuffed electronic envelope to the electronic signature/payment orchestration service 156 (step 362).

Figure 10:
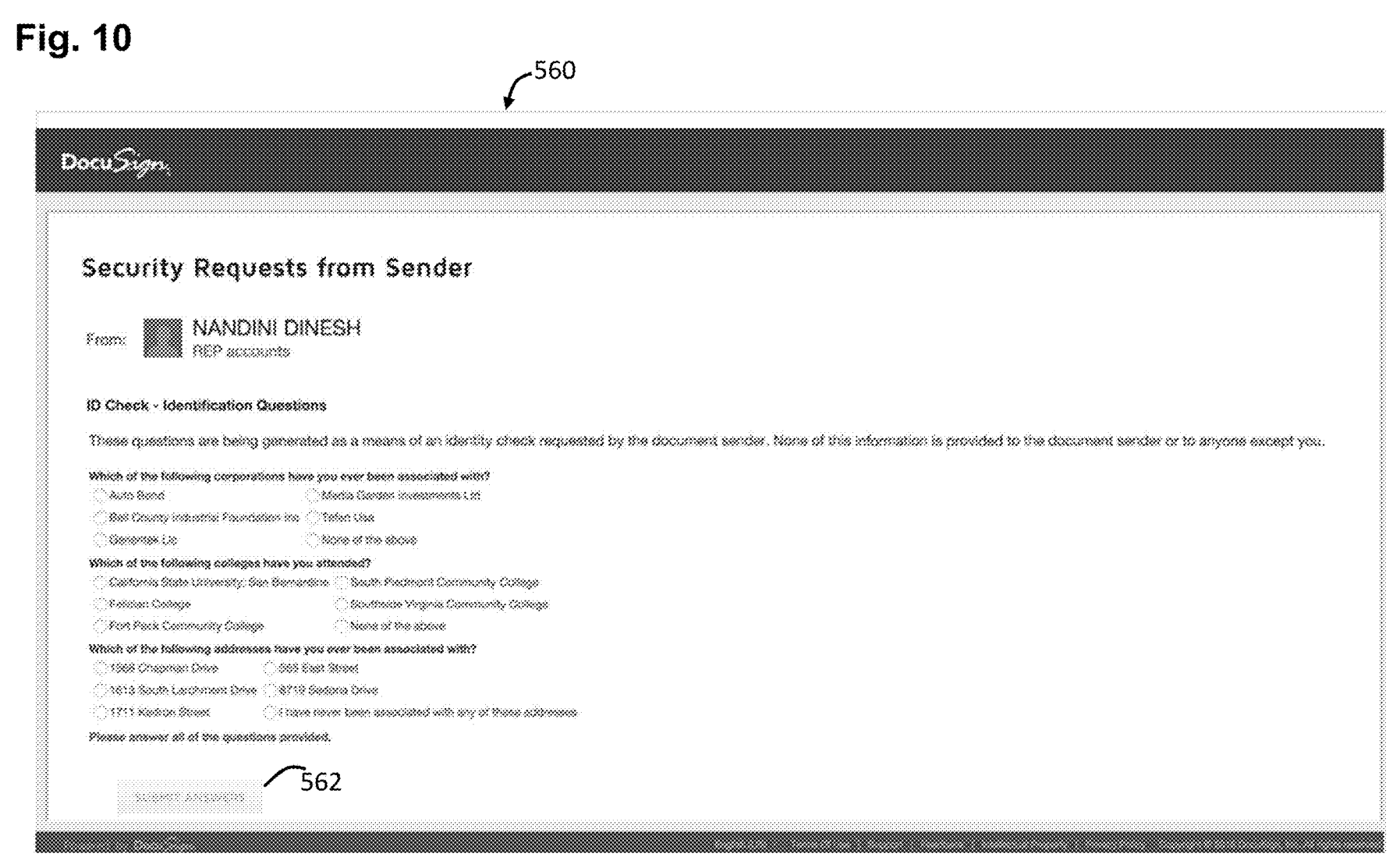

After opening the email, the taxpayer 110 may click on the access URL that was attached to the stuffed electronic envelope to access the attached documents stored in property bag of the user account database 174 linked to the document access URL (step 364). The document access URL may be represented by a graphical button in the email, such as the graphical button 352 contained in the email 350 illustrated in FIG. 9. Prior to granting access to the documents (including the form 8879 and tax return 132), the third party electronic signature service 170 prompts the taxpayer 110 with knowledge-based authentication questions (e.g., three questions) to ensure that the recipient of the electronic envelope is the intended recipient (i.e., the taxpayer 110) (step 366). For example, a screen 560 comprising a set of authentication questions can be presented to the taxpayer 110, as illustrated in FIG. 10. After answering the questions, the taxpayer 110 can click or otherwise actuate the question submission button 362 to send the answers to the third part electronic signature service 170. If correctly answered, the third party electronic signature service 170 sends the documents (in this case, the tax return and form 8879) and payment token (assuming payment has been requested by the ERO 106) in the property bag of the user account database 174 corresponding to the identification number of the envelope 144 to the taxpayer 110 (step 368).

Figure 11:
FIG. 11 is a plan view of a Form 8879 that can be displayed by the system of FIG. 1 to the taxpayer for making an electronic signature.
Figure 12:
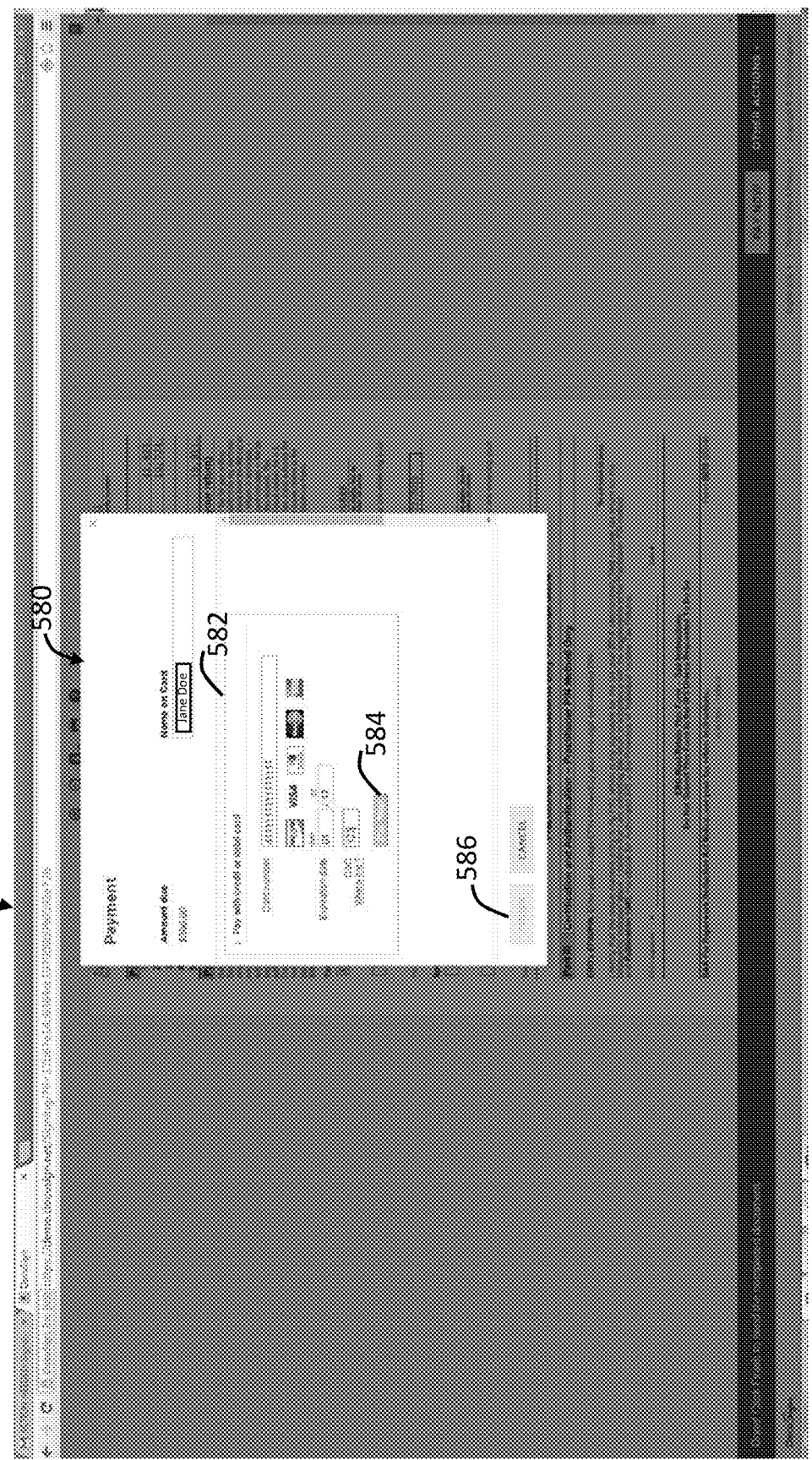
FIG. 12 is a plan view of an electronic payment pop-up window that can be displayed to the taxpayer for making an electronic payment.

The taxpayer 110 may then review the tax return 132, and electronically sign the document 145 (in this case, the form 8879) (step 370). A window 570 containing the form 8879 with a signature block 572 can be displayed to the taxpayer 110 for electronic signature, as illustrated in FIG. 10. Electronic signing may be effected in any one of a variety of manners, such as typing in initials in the signature block of the form 8879, clicking on a pre-existing signature that is attached to the signature block of the form 8879, or creating a new signature that is attached to the signature block of the form 8879. If requested, the taxpayer 110 makes payment to the on-line payment service 176 (step 372). For example, as illustrated in FIG. 11, the window 570 may contain a pay now button 574 that can be clicked or otherwise actuated by the taxpayer 110, which causes a payment pop-up window 580 to be displayed to the taxpayer 110, as illustrated in FIG. 12. The payment pop-up window 580 comprises a credit card information area 582 in which the taxpayer 110 can enter credit card information, and a graphical pay button 584 that can be clicked or otherwise actuated by the taxpayer 110 to complete payment to the on-line payment service 176.

Upon electronically signing the form 8849 and making payment to the on-line payment service 176, which can, for example, be confirmed by clicking or otherwise actuating a graphical finish button 576 in the window 570, the signed form 8879 is sent back to the third party electronic signature service 170, which stores it in the property bag in the user database 174 corresponding to the identification number of the envelope 144 (step 374), and the status of the payment is transmitted from the on-line payment service 176 to the third party electronic signature service 170 (step 376). Alternatively, the status of the payment may be transmitted from the on-line payment service 176 directly to the electronic signature/payment orchestration service 156, bypassing the third party electronic signature service 170. Collection of the electronically signed form 8879 and payment (if requested) results in a completed envelope.

The third party electronic signature service 170 then sends the envelope status (i.e., that the signed form 8879 has been signed and returned by the taxpayer 110, and that the taxpayer 110 has made payment to the on-line payment service 176), as well as the payment token, to the electronic signature/payment orchestration service 156 (step 378). In response, the electronic signature/payment orchestration service 156 removes the hold for that envelope and permanently decrements it from the available envelope balance in the ERO entitlement database 160 (step 380). In the case where the ERO 106 is billed in arrears, the electronic signature/payment orchestration service 156 will inform the ERO billing service 162 that an envelope has been used and needs to be billed to the ERO 106.

The electronic signature/payment orchestration service 156 then instructs the electronic tax return filing service 192 to file the tax return 132 with the tax agency 118 (step 382), which retrieves the electronic tax return 132a from the tax return database 168, formats it, and transmits the formatted electronic tax return 132b to the tax agency 118. The electronic signature/payment orchestration service 156 also instructs the taxpayer accounting service 154 to update the taxpayer accounting database 166 by closing the invoice correlated to the payment token reflecting the balance owed by the taxpayer 110 to the ERO 106 (step 384).

In the illustrated embodiment, the electronic signature/payment orchestration service 156 automatically instructs the electronic tax return filing service 192 to file the tax return 132 with the tax agency 118 without any further intervention from the ERO 106, although in alternative embodiments, the electronic signature/payment orchestration service 156 may only instruct the electronic tax return fling service 192 to file the tax return 132 with the tax agency 118 upon a prompt from the ERO 106, such as, e.g., upon the ERO 106 logging into the tax preparation program 130.

Figure 13:
FIG. 13 is a plan view of an envelope status window that can be displayed by the system of FIG. 1 to the ERO.

The electronic signature/payment orchestration service 156 is capable of tracking various parameters regarding the envelopes and payments and transmitting these parameters to the electronic signature component 140 of the tax preparation program 130 for display in a "dashboard" upon request by the ERO 106. For example, as illustrated in FIG. 13, the electronic signature component 140 may display a dashboard 190 that comprises a graphical indicator 192a that indicates the average response time for taxpayers 110 to which an ERO 106 has sent envelopes 144, a graphical indicator 192b that indicates the amount of money collected for the month from taxpayers 110 to which the ERO 106 has sent envelopes 144, a graphical indicator 192c that indicates the average response time for taxpayers 100 to which the company/firm 102 has sent envelopes has sent envelopes 144, a graphical indicator 192d that indicates the amount of money collected for the month from taxpayers 110 to which the company/firm 102 has sent envelopes 144, a graphical indicator 192e that indicates the number of purchased envelopes 144 available to be used by the ERO 106, a graphical indicator 192f that indicates the number of trial envelopes 144 available to be used by the ERO 106, a graphical indicator 192g that indicates the number of envelopes 144 sent by the ERO 106 to taxpayers 110, a graphical indicator 192h that indicates the number of envelopes 144 sent by the ERO 106 to taxpayers 110 that have been completed, and a graphical indicator 192i that indicates the number of envelopes 144 sent by the ERO 106 to taxpayers 110 that have been cancelled or voided. The dashboard 190 may also include a table 194 that specifies information regarding each envelope 144 sent by the ERO 106 to a taxpayer 110, including client name 194a, client identification number 194b, country and/or state of tax return or returns attached to envelope 194c, status of envelope 194d (including completed, sent signature request but not complete, and signature request to be sent), date envelope was sent to taxpayer 194e, date electronic signature collected 194f, date payment collected 194g, and whether envelope was voided 194h.

In the foregoing specification, embodiments have been described with reference to the figures. It will, however, be evident that various modifications and changes may be made thereto without departing from the broader spirit and scope of the invention, and that figures and examples provided are not provided to limit the scope of embodiments. Thus, the specification and drawings are, accordingly, to be regarded in an illustrative rather than restrictive sense. Further, where methods or processes described above indicate certain events occurring in certain order, those of ordinary skill in the art having the benefit of this disclosure would recognize that the ordering may be modified and that such modifications are in accordance with the variations of the invention. Additionally, parts of methods may be performed concurrently in a parallel process when possible, as well as performed sequentially. Accordingly, embodiments are intended to exemplify alternatives, modifications, and equivalents that may fall within the scope of the claims.

What is claimed is:

1. A method for electronically filing a financial document with an agency on behalf of a client, comprising:
    receiving, at an electronic return originating computer, a financial document from a first computing device operated by an electronic filing entity;
    receiving, at the electronic return originating computer, a first request from the first computing device to collect an electronic signature from the client on an authorization form authorizing electronic filing of the financial document with the agency on behalf of the client, and to collection electronic payment from the client for electronically filing the financial document with the agency;
    sending, by the electronic return originating computer, a second request to a second computing device for an electronic envelope, the second computing device being operated by an electronic signature service;
    receiving, at the electronic return originating computer, the electronic envelope from the second computing device;
    sending, by the electronic return originating computer, the electronic envelope to the first computing device, whereby the first computing device forms a stuffed electronic envelope comprising the authorization form and the electronic envelope; and
    sending, by the first computing device, the stuffed electronic envelope with the authorization form to the second computing device, the second computing device collecting the electronic signature from the client and facilitating electronic payment from the client to a third computer operated by an on-line payment service;
    receiving, at the electronic return originating computer, a first status from the second computer that the electronic signature has been collected from the client;
    receiving, at the electronic return originating computer, a second status that the electronic payment has been collected from the client; and
    electronically filing from the electronic return originating computer the financial document with the agency based on the received first status and received second status.

2. The method of claim 1, wherein the collected electronic payment is associated with an invoice reflecting a balance owed by the client to the electronic filing entity, the method further comprising closing the invoice based on the received second status.

3. The method of claim 2, wherein the invoice is automatically closed in response to receiving the second status without any further intervention by the first computing device.

4. The method of claim 1, wherein the second status is received from the second computing device.

5. The method of claim 1, wherein the financial document is automatically filed with the agency in response to receiving the first status and the second status without any further intervention by the first computing device.

6. The method of claim 1, further comprising sending the first status and the second status to the first computing device, wherein the financial document is only filed with the agency in response to subsequently receiving an instruction from the first computing device.

7. The method of claim 1, wherein the agency is a governmental agency.

8. The method of claim 7, wherein the governmental agency is a tax agency, and the electronic financial document is an electronic tax return.

9. The method of claim 8, wherein the tax agency is the Internal Revenue Service (IRS), and the authorization form is a form 8879.

10. The method of claim 1, wherein the electronic signature service is a third party electronic signature service.

11. The method of claim 1, further comprising:
    sending, by the electronic return originating computer, a third request to the second computing device to provision an account for the electronic filing entity with the electronic signature service;
    receiving, at the electronic return originating computer, an access token from the second computing device; and
    sending, by the electronic return originating computer, the access token to the first computing device, wherein the first computing device sends the access token to the second computing device to allow the second computing device to access the account of the electronic filing entity.

12. The method of claim 1, further comprising:
    receiving, at the electronic return originating computer, a document access uniform resource locator (URL) from the second computing device, the document access URL identifying a location in a database; and
    sending, by the electronic return originating computer, the document URL to the first computing device, wherein the first computing device sends the document access URL to the second computing device to allow the second computing device to store the authorization form in location of the database identified by the document access URL.

13. The method of claim 1, further comprising:
   receiving, at the electronic return originating computer, a third request from the first computing device to provide the first status and the second status; and
   sending, by the electronic return originating computer, the first status and the second status to the first computing device for display to the electronic filing entity.

14. The method of claim 1, further comprising determining, by the electronic return originating computer, whether the electronic filing entity is entitled to use the electronic signature service, wherein the electronic envelope is sent to the first computing device in response to determining that the electronic filing entity is so entitled.

15. A computer program product comprising a non-transitory computer readable storage medium having stored thereupon a sequence of instructions which, when executed by a computer, performs a method comprising:
   receiving, at an electronic return originating computer, a financial document from a financial document preparation program;
   receiving, at the electronic return originating computer, a first request from the financial document preparation program to collect an electronic signature from a client on an authorization form authorizing electronic filing of the financial document with an agency on behalf of the client, and to collect electronic payment from the client for electronically filing the financial document with the agency;
   sending, by the electronic return originating computer, a second request to an electronic signature module for an electronic envelope;
   receiving, at the electronic return originating computer, the electronic envelope from the electronic signature module;
   sending, by the electronic return originating computer, the electronic envelope to the financial document preparation program, whereby the financial document preparation program forms a stuffed electronic envelope comprising the authorization form and the electronic envelope;
   sending, by the electronic return originating computer, the stuffed electronic envelope with the authorization form to the electronic signature module, the electronic signature module collecting the electronic signature from the client and facilitating electronic payment from the client to an on-line payment module;
   receiving, at the electronic return originating computer, a first status from the electronic signature module that the electronic signature has been collected from the client;
   receiving, at the electronic return originating computer, a second status that the electronic payment has been collected from the client; and
   electronically filing, by the electronic return originating computer, the financial document with the agency based on the received first status and received second status.

16. The computer program product of claim 15, wherein the collected electronic payment is associated with an invoice reflecting a balance owed by the client to the electronic filing entity the method further comprising instructing the client accounting module to close the invoice based on the received second status.

17. The computer program product of claim 16, wherein the method further comprises automatically closing the invoice in response to receiving the second status without any further intervention by the financial document preparation program.

18. The computer program product of claim 15, wherein the second status is received from the electronic signature module.

19. The computer program product of claim 15, wherein the method further comprises automatically instructing the financial document filing module to file the financial document with the agency in response to receiving the first status and the second status without any further intervention by the financial document preparation program.

20. The computer program product of claim 15, wherein the method further comprises sending the first status and the second status to the financial document preparation program, and filing the financial document in response to subsequently receiving an instruction from the financial document preparation program.

21. The computer program product of claim 15, wherein the agency is a governmental agency.

22. The computer program product of claim 21, wherein the governmental agency is a tax agency, the electronic financial document is an electronic tax return, the financial document preparation program is a tax preparation program, and the financial document filing module is a tax return filing module.

23. The computer program product of claim 22, wherein the tax agency is the Internal Revenue Service (IRS), and the authorization form is a form 8879.

24. The computer program product of claim 15, wherein the electronic signature module is a third party electronic signature module.

25. The computer program product of claim 15, wherein the method further comprises:
   sending, by the electronic return originating computer, a third request to the electronic signature module to provision an account for the electronic filing entity with the electronic signature module;
   receiving, at the electronic return originating computer, an access token from the electronic signature module; and
   sending, by the electronic return originating computer, the access token to the financial document preparation program, wherein the financial document preparation program sends the access token to the electronic signature module to allow the electronic signature module to access the account of the electronic filing entity.

26. The computer program product of claim 15, wherein the method further comprises:
   receiving, at the electronic return originating computer, a document access uniform resource locator (URL) from the electronic signature module, the document access URL identifying a location in a database; and
   sending, by the electronic return originating computer, the document URL to the financial document preparation module, wherein the financial document preparation module sends the document access URL to the electronic signature module to allow the second computing device to store the authorization form in location of the database identified by the document access URL.

27. The computer program product of claim 15, wherein the method further comprises:
   receiving, at the electronic return originating computer, a third request from the financial document preparation program to provide the first status and the second status; and
   sending, by the electronic return originating computer, the first status and the second status to the financial document preparation program for display to the electronic filing entity.

28. The computer program product of claim 15, wherein the method further comprises determining, by the electronic return originating computer, whether the electronic filing entity is entitled to use the electronic signature module, wherein the electronic envelope is sent to the financial document preparation program in response to determining that the electronic filing entity is so entitled.

29. A method for electronically filing a financial document with an agency on behalf of a client, comprising:
- receiving, at an electronic return originating computer, a financial document from a first computing device being operated by an electronic filing entity;
- receiving, at the electronic return originating computer, a first request from the first computing device to collect an electronic signature from the client on an authorization form authorizing electronic filing of the financial document with the agency on behalf of the client, and to collect electronic payment from the client for electronically filing the financial document with the agency;
- determining, by the electronic return originating computer, that the electronic signature has been collected from the client;
- determining, by the electronic return originating computer, that the electronic payment has been collected from the client; and
- automatically filing, from the electronic return originating computer, the financial document with the agency in response to determining that the electronic signature and electronic payment has been collected from the client without further intervention from the first computing device, wherein a stuffed electronic envelope comprising an authorization form and an electronic envelope is used to obtain the electronic signature.

30. The method of claim 29, wherein the electronic signature is collected from the client by a second computing device operated by a third party electronic signature service.

31. The method of claim 29, wherein the electronic payment is collected from the client by a third computing device operated by an on-line payment service.

32. The method of claim 29, wherein the electronic payment collected by the electronic filing entity is associated with an invoice reflecting a balance owed by the client to the electronic filing entity, the method further comprising automatically closing the invoice in response to determining that the electronic signature and electronic payment has been collected from the client without further intervention from the first computing device.

33. The method of claim 29, wherein determining that the electronic signature has been collected from the client comprises receiving a status from a second computing device operated by an electronic signature service.

34. The method of claim 29, wherein determining that the electronic payment has been collected from the client comprises receiving status from a second computing device operated by an on-line payment service.

35. The method of claim 29, wherein the agency is a governmental agency.

36. The method of claim 35, wherein the governmental agency is a tax agency, and the electronic financial document is an electronic tax return.

37. The method of claim 36, wherein the tax agency is the Internal Revenue Service (IRS), and the authorization form is a form 8879.

38. The method of claim 29, further comprising provisioning an account for the electronic filing entity with an electronic signature service.

39. The method of claim 29, further comprising:
- receiving, at the electronic return originating computer, a second request from the first computing device to provide a status on the collection of the electronic signature and electronic payment from the client; and
- sending, by the electronic return originating computer, the status to the first computing device for display to the electronic filing entity.

40. The method of claim 29, further comprising determining, by the electronic return originating computer, whether the electronic filing entity is entitled to use the electronic signature service.

41. A computer program product comprising a non-transitory computer readable storage medium having stored thereupon a sequence of instructions which, when executed by a computer, performs a method comprising:
- receiving, at an electronic return originating computer, a financial document from a financial document preparation program;
- receiving, at the electronic return originating computer, a first request from the financial preparation program to collect an electronic signature from the client on an authorization form authorizing electronic filing of the financial document with the agency on behalf of the client, and to collect electronic payment from the client for electronically filing the financial document with the agency;
- determining, by the electronic return originating computer, that the electronic signature has been collected from the client;
- determining, by the electronic return originating computer, that the electronic payment has been collected from the client; and
- automatically filing, from the electronic return originating computer, the financial document with the agency in response to determining that the electronic signature and electronic payment has been collected from the client without further intervention from the financial document preparation program, wherein a stuffed electronic envelope comprising an authorization form and an electronic envelope is used to obtain the electronic signature.

42. The computer program product of claim 41, wherein the electronic signature is collected from the client by a third party electronic signature module.

43. The computer program product of claim 41, wherein the electronic payment is collected from the client by an on-line payment module.

44. The computer program product of claim 41, wherein the collected electronic payment is associated with an invoice reflecting a balance owed by the client to the electronic filing entity, the method further comprising automatically closing the invoice in response to determining that the electronic signature and electronic payment has been collected from the client without further intervention from the financial document preparation program.

45. The computer program product of claim 41, wherein the method further comprises determining that the electronic payment has been collected from the client by receiving status from an on-line payment module.

46. The computer program product of claim 41, wherein the agency is a governmental agency.

47. The computer program product of claim 46, wherein the governmental agency is a tax agency, the electronic financial document is an electronic tax return, the financial document preparation program is a tax preparation program, and the financial document filing module is a tax return filing module.

48. The computer program product of claim 47, wherein the tax agency is the Internal Revenue Service (IRS), and the authorization form is a form 8879.

49. The computer program product of claim 41, wherein the method further comprises provisioning an account for the electronic filing entity with an electronic signature module.

50. The computer program product of claim 41, wherein the method further comprises:
   receiving, at the electronic return originating computer, a request from the financial document preparation module to provide a status on the collection of the electronic signature and electronic payment from the client; and sending the status to the financial document preparation module for display to the electronic filing entity.

* * * * *